(12) United States Patent
Kimura et al.

(10) Patent No.: US 7,492,674 B2
(45) Date of Patent: Feb. 17, 2009

(54) LOADING MECHANISM, DRIVE UNIT, AND INFORMATION PROCESSING APPARATUS

(75) Inventors: Masafumi Kimura, Kanagawa (JP); Toshihiro Yamashiro, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 246 days.

(21) Appl. No.: 11/633,007

(22) Filed: Dec. 4, 2006

(65) Prior Publication Data

US 2007/0079311 A1 Apr. 5, 2007

Related U.S. Application Data

(62) Division of application No. 10/645,638, filed on Aug. 22, 2003, now Pat. No. 7,206,261.

(30) Foreign Application Priority Data

Aug. 30, 2002 (JP) ............................. 2002-253707
Aug. 30, 2002 (JP) ............................. 2002-256225

(51) Int. Cl.
*G11B 17/04* (2006.01)
(52) U.S. Cl. .................................... 369/30.36; 720/619
(58) Field of Classification Search .............. 369/30.36, 369/75.1, 75.11, 75.2, 75.21, 77.1, 77.11, 369/77.2, 77.21; 720/619, 613
See application file for complete search history.

(56) References Cited

U.S. PATENT DOCUMENTS 6,208,605 B1  3/2001  Akiba

| 6,910,218 | B2 | 6/2005 | Park et al. |
| 7,131,127 | B2 * | 10/2006 | Nasu ........................... 720/613 |
| 7,206,261 | B2 * | 4/2007 | Kimura et al. ........... 369/30.36 |
| 2001/0021155 | A1 | 9/2001 | Saito |
| 2002/0027860 | A1 | 3/2002 | Kang et al. |
| 2003/0043719 | A1 | 3/2003 | Yeh et al. |

FOREIGN PATENT DOCUMENTS

| JP | 04-035244 | 3/1992 |
| JP | 07-010837 | 3/1992 |
| JP | 04-102255 | 4/1992 |
| JP | 10-083607 | 3/1998 |
| JP | 10-188421 | 7/1998 |
| JP | 11-328801 | 11/1999 |

* cited by examiner

*Primary Examiner*—Angel A. Castro
(74) *Attorney, Agent, or Firm*—Dickstein Shapiro LLP

(57) ABSTRACT

A loading mechanism includes a frame and a tray on which an information recording medium is placeable. The tray includes a groove part and is movable between a first position where the information recording medium is contained completely inside the frame and a second position where the information recording medium is exposed completely outside the frame. The loading mechanism further includes at least three projections arranged on the frame at predetermined intervals along the sliding directions of the tray. The projections include first and second guide and support parts forming the first and second ends of the arrangement of the projections. The first and second guide and support parts come into substantially point or linear contact with the groove part of the tray so as to guide and support the tray when the tray is in the second position.

12 Claims, 18 Drawing Sheets

FIG.1 PRIOR ART
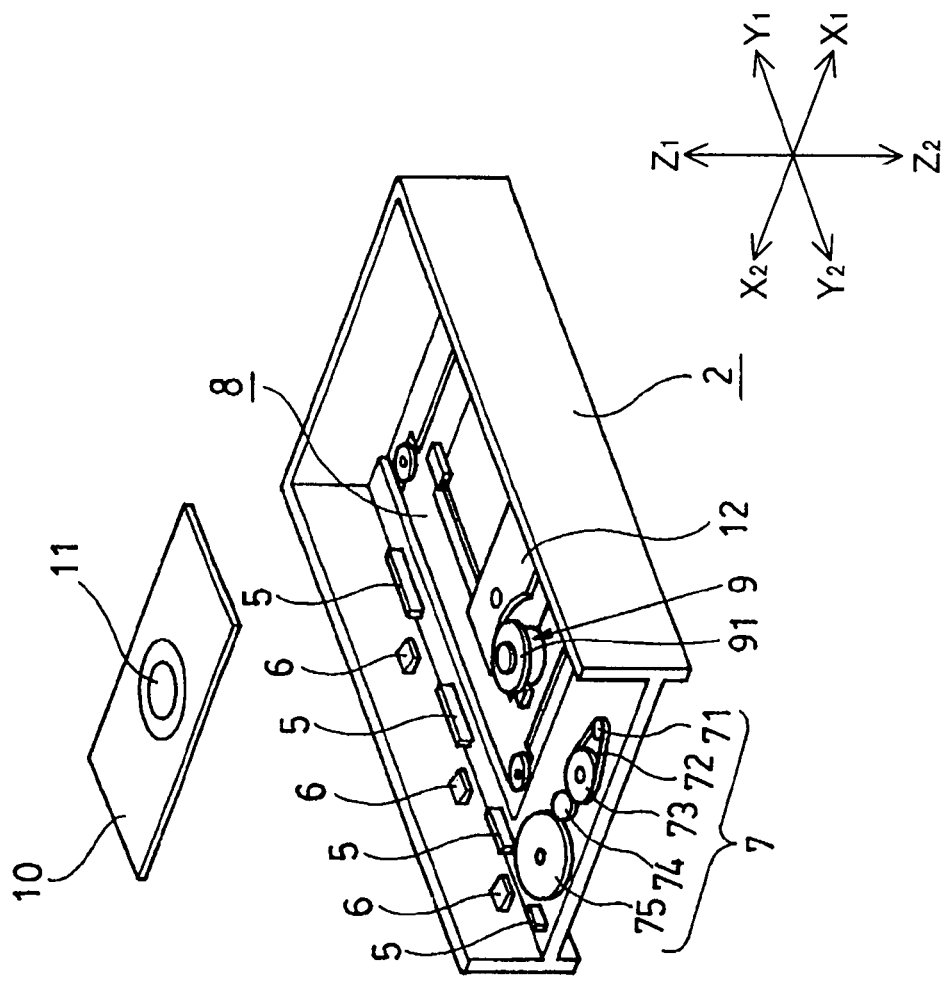
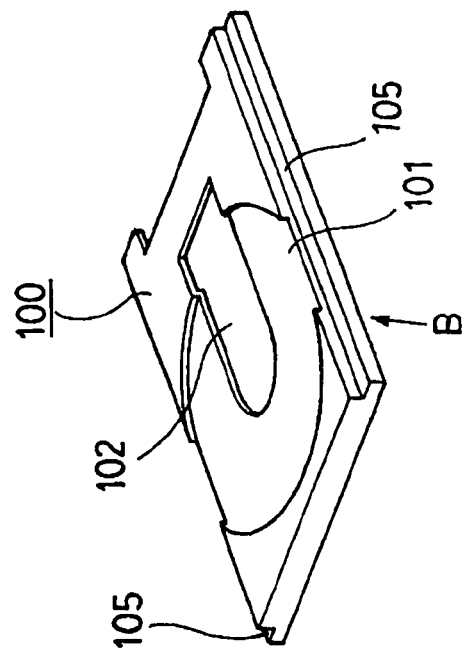

FIG.17A
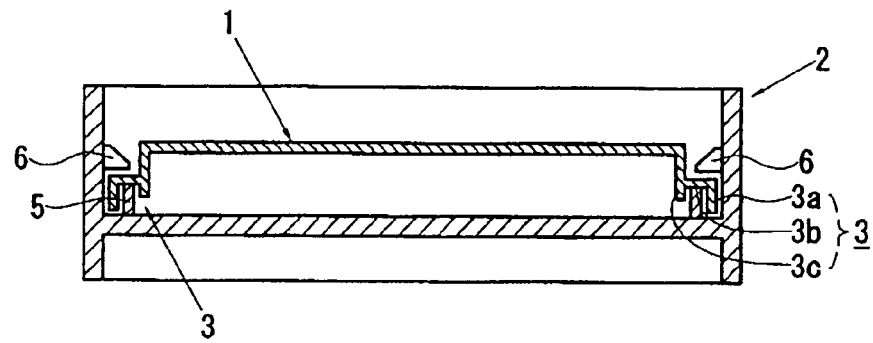
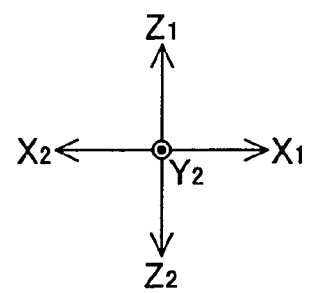
FIG.17B
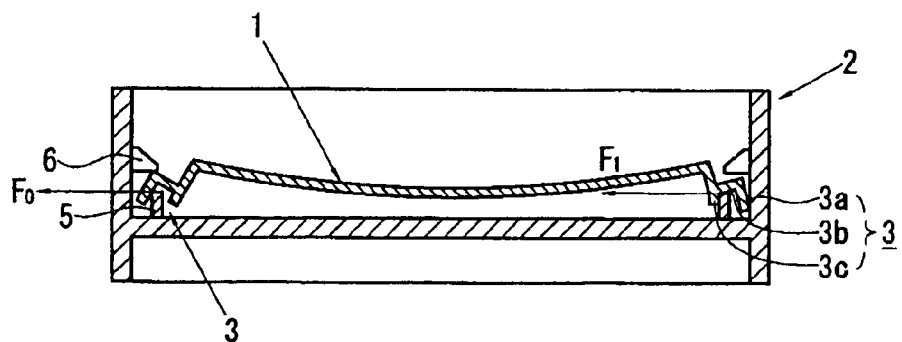
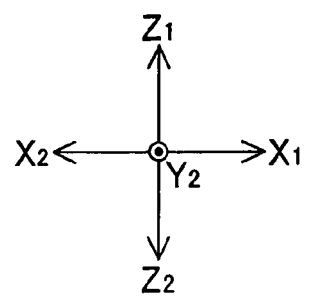

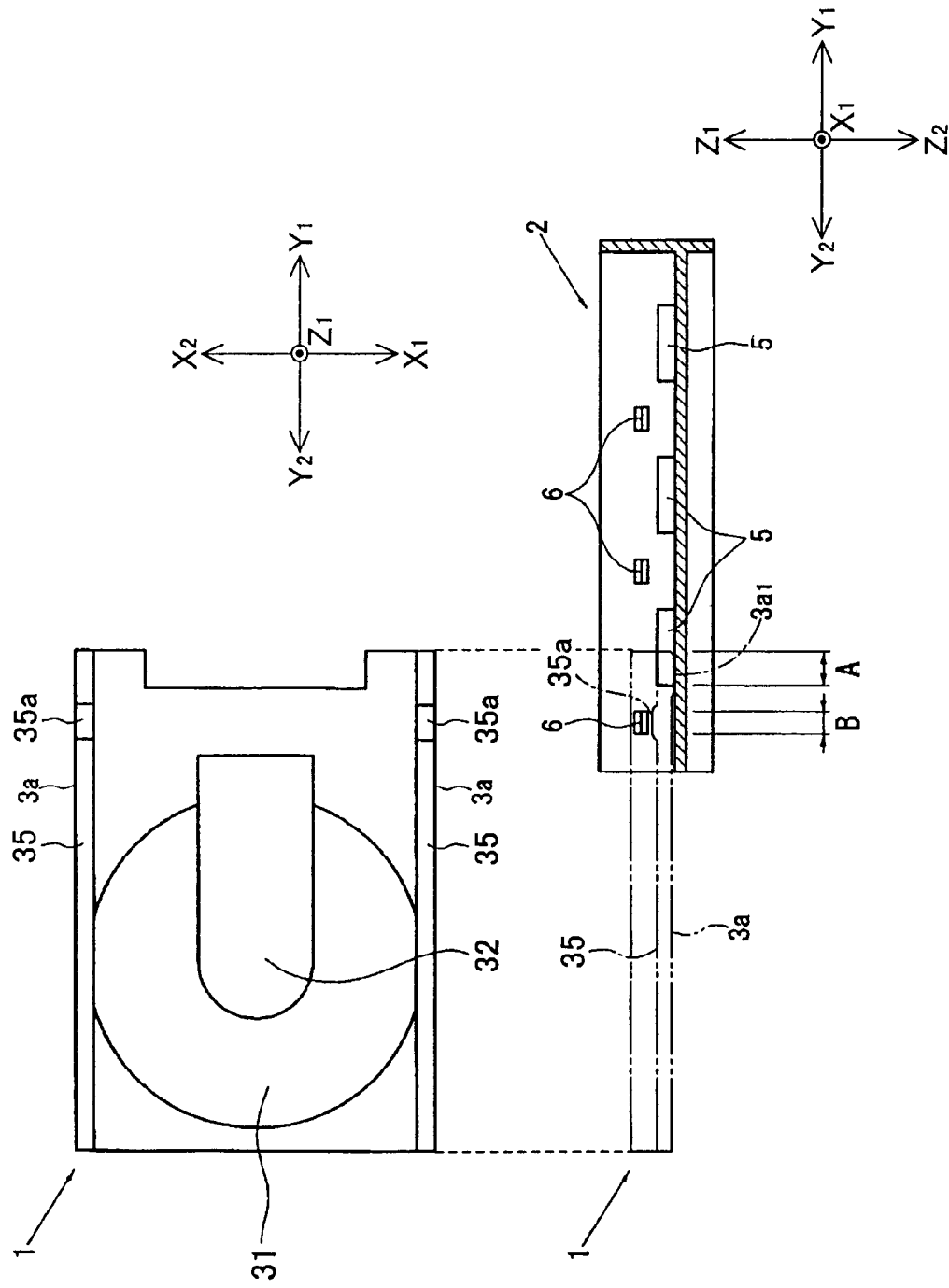

LOADING MECHANISM, DRIVE UNIT, AND INFORMATION PROCESSING APPARATUS

This application is a divisional application of Ser. No. 10/645,638, filed Aug. 22, 2003, now U.S. Pat. No. 1,206,261 the disclosure of which is incorporated by reference in its entirety.

BACKGROUND OF THE INVENTION

1. Field of the Invention

The present invention generally relates to loading mechanisms, drive units, and information processing apparatuses, and more particularly to a loading mechanism for loading an information recording medium in a predetermined position and unloading the information recording medium from the predetermined position, a drive unit including the loading mechanism, and an information recording apparatus including the drive unit. The drive unit may be an optical disk drive unit for recording data on, reproducing data from, or rewriting the data of an information recording medium (hereinafter referred to also as an optical disk or simply as a disk).

2. Description of the Related Art

Recently, the digitization of information apparatuses and the accompanying rapid development of multimedia apparatuses have caused an increase in the amount of information (data) processed. This requires information recording media to have an even larger capacity.

Therefore, computers, audio equipment, and visual equipment have come to employ compact disks (CDs) and digital versatile disks (DVDs), which have the same disk diameter as the CDs but can record seven times as much data.

Disk drive units for recording data and reproducing data from these recording media can record information including data, audio information, and visual information on a recording medium by forming mark and space regions on the surface of the recording medium. Further, the disk drive units can read information recorded on the surface of a recording medium by emitting a laser beam onto the surface of the recording medium while the recording medium is being rotated at high speed, detecting light reflected from the surface, and converting the detected light into an electrical signal.

Normally, the disk drive unit includes a loading mechanism for positioning a disk at a position where data can be read from or written to the disk by transporting the disk to the inside of the disk drive unit after placing the disk on a tray pulled outside the disk drive unit.

In a conventional (optical) disk drive unit, when an optical disk is set inside the drive unit or extracted therefrom, first, a drawer-like tray for transporting the disk is slid and ejected from the loading base (frame) of the drive unit. This operation is hereinafter referred to as "tray unloading." At this point, most of the tray protrudes outward from the loading base.

Thereafter, when a user places or removes the disk on or from the tray, and operates the drive unit or an apparatus such as a personal computer connected to the drive unit, the tray is slid in the reverse direction and pulled inside the loading base (hereinafter, this operation is referred to as "tray loading") to be transported to a predetermined position inside the drive unit.

FIGS. 1 through 5 are schematic diagrams showing a conventional optical disk drive unit for providing a simplified description of its mechanism and operation. FIG. 1 is an exploded perspective view of the drive unit, which is disassembled into a loading base (frame) 2, a clamper 11, and a tray 100. FIG. 2 is a top plan view of the loading base 2. FIG. 3 is a bottom plan view of the tray 100. FIG. 4 is a cross-sectional view of the loading base 2 to which the tray 100 is attached. FIG. 5 is a top plan view of the tray 100 and the loading base 2 in a tray-unloaded state, where the tray 100 is unloaded from (extended from or exposed outside) the loading base 2.

Referring to FIG. 1, the substantially circular clamper 11 is attached to the upper parts of the $X_1$ and $X_2$ sides of the loading base 2 through a substantially rectangular clamper holder 10 and an attachment part (not shown in the drawings).

A circular concave part 101 for receiving an optical disk (not shown in the drawings) and an elongated hole 102 having a rounded end in the $Y_2$ direction and a squared end in the $Y_1$ direction are formed in the center part of the tray 100. Further, a step part 105 is formed on each side part of the tray 100 extending along the Y-axis.

The substantially box-shaped loading base 2 has an open side in the $Y_2$ direction. The tray 100 is attached to the loading base 2 so as to be slidable so that part of the tray 100 can be extracted from and retracted in the loading base 2 through its $Y_2$ open side.

As shown in FIGS. 1 and 2, a tray driving mechanism 7 composed of a loading motor 71, a belt 72, a pulley gear 73, an intermediate gear 74, and a gear 75 is provided in the vicinity of the $Y_2$ open side of the loading base 2. Further, a traversing mechanism 8 including a spindle motor 9 to which a turntable 91 is attached and an optical pickup 12 is provided in the center of the bottom of the loading base 2.

A plurality of rails 5, which are linear projections parallel to the Y-axis, are provided on each side on the bottom of the loading base extending along the Y-axis. Further, a plurality of tray holders 6, which are claw-like projections, are provided in a line on the surface of each inner wall of the loading base 2 along the Y-axis.

As shown in FIGS. 3 and 4, a rail groove 103 is formed on each side end (the opposite side of each step part 105) of the bottom surface of the tray 100 along the Y-axis. Each rail groove 103 includes an outer linear projection 131, a groove part 132, and an inner linear projection 133 all parallel to the Y-axis. The rail grooves 103 engage the rails 5 of the loading base 2 so that the tray 100 can slide on the rails 5.

Further, a saw-toothed rack 104 is provided to the inner linear projection 133 of one of the rail grooves 103 (the $X_2$-side rail groove 103 in FIG. 3) so as to face inward (toward the other rail groove 103) to engage the gear 75 (pinion) of the tray driving mechanism 7.

According to this optical disk drive unit, the loading motor 71 rotates at the time of tray loading and unloading, and transmits its rotation to the rack 104 of the tray 100 via the belt 72, the pulley gear 73, the intermediate gear 74, and the gear 75 so as to slide the tray 100 in the $Y_1$ and $Y_2$ directions.

In the case of tray loading, the tray 100 in the unloaded state of FIG. 5 is pulled inside the loading base 2, and thereafter, the traversing mechanism 8 is raised up to the position of the clamper holder 10 so that the clamper 11 and the turntable 91 of the spindle motor 9 are in forced contact with each other.

On the other hand, in the case of tray unloading, the traversing mechanism 8 is lowered to its position shown in FIG. 1, and thereafter, the tray 100 is ejected outward from the loading base 2 as shown in FIG. 5.

The tray holders 6 prevent the tray 100 from being lifted up a predetermined distance or more from the bottom of the loading base 2, thereby preventing the tray 100 from disengaging from the loading base 2.

However, this type of optical disk drive unit develops trouble easily if an impact (external force) is applied to the tray 100 when the tray 100 is ejected from the loading base 2 as shown in FIG. 5.

Therefore, some conventional optical disk drive units, when sliding and ejecting the tray, disengage the gear driving the tray from a rotation body that raises or lowers the traversing mechanism in conjunction with the rotation of the gear. As a result, in those conventional drive units, the rotation body remains totally unaffected even if the ejected tray is forcibly stopped, pushed, or pulled. That is, in those conventional drive units, even if an impact is applied to the ejected tray from its front direction (the $Y_2$ direction in FIG. 5), this only results in the tray being retracted inside the drive unit without damage to the gear or the rotation body. Japanese Laid-Open Patent Application No. 10-188421 discloses such a conventional drive unit.

The above-described conventional drive units, however, cannot prevent failure from occurring if an impact is applied to the tray ejected from the loading base from its sideward directions (the $X_1$ and $X_2$ directions in FIG. 5).

This is because if the tray in the ejected state receives an impact from the sideward directions of the disk-unit, the tray may deform so as to have its rail grooves disengaged from the rails of the loading base.

Referring to FIG. 5, if an external force Fa or Fb is exerted from the sideward ($X_2$ or $X_1$) direction on the tray 2 ejected from the optical disk drive unit, torque is exerted on the tray 2 about a fulcrum Pa or Pb that is the furthest one of the rails 5 in the $Y_2$ direction. As a result, a load is applied to the rear ($Y_1$-side) edge Ea or Eb of the tray 2. If the point of application of the external force Fa or Fb is substantially the front ($Y_2$-side) end of the tray 2 and the impact force is great, the rear part of the tray 2, which is thin as a general rule, becomes bent so that the rail groove 3 disengages from the rail 5 at the rear end Ea or Eb. Once the rail groove 3 disengages from the rail 5, it is impossible to perform tray loading and unloading operations.

In the conventional optical disk drive unit, when an external force such as an impact is exerted on the ejected tray at the time of tray unloading, the tray is supported at approximately one or two points on the loading base. If an external force is applied to the front end of the ejected tray, a high stress is exerted on the supporting part(s) by the moment. As a result, the tray may disengage from the engagement part of the loading base, and in the worst case, the tray may be broken. In any case, it becomes impossible to perform tray loading and unloading operations, thus causing great trouble to users.

FIGS. 6A and 6B are diagrams showing other configurations of the loading mechanism. The loading mechanism of FIG. 6A includes a tray 80 and a tray holding member (hereinafter referred to as a "frame") 50. In this case, a pair of groove parts 80c and 80d are formed on the $X_2$- and $X_1$-side ends of the tray 80, respectively, so as to extend along the Y-axis. A plurality of cylindrical projections (bosses) 54 and a plurality of cylindrical projections (bosses) 54' are formed on the frame 50 at predetermined intervals along the Y-axis so as to correspond to the groove parts 80c and 80d, respectively, of the tray 80. With the groove parts 80c and 80d engaging the bosses 54 and 54', respectively, of the frame 50, the tray 80 can move back and forth along the Y-axis using the bosses 54 and 54' as guides for the groove parts 80c and 80d. In this case, for instance, it is sufficient that only the bosses 54 remain in contact with the corresponding groove part 80c. There is often a space between the bosses 54' and the groove part 80d.

On the other hand, in the loading mechanism of FIG. 6B, as is opposite to the loading mechanism of FIG. 6A, a plurality of cylindrical projections (bosses) 180a and 180a' are formed on the tray 80', while guide grooves 354 and 354' are formed on the frame 50.

A rapid spread of information equipment in recent years has increased the number of opportunities for those users who are not necessarily experienced in handling information apparatuses to use them. Further, there is also a continuing rapid increase in the number of opportunities to use information apparatuses at home. Therefore, there are more opportunities for children to use information apparatuses. In these cases, a wrong use of the drive unit or unintentional contact with the drive unit by the user may cause a great external force to be exerted on the tray ejected outside the drive unit. It is desirable that the drive unit operate normally without developing any trouble even in these cases.

In the ejected state, the tray is required to be in contact with the frame (projections) at least at two points. The conventional drive unit is designed so that the number of bosses that come into contact with the grooves formed on the tray in the ejected state is minimized (that is, two) in consideration of vibration generated by the movement of the tray.

However, if an external force is exerted on the ejected tray held only by the two cylindrical bosses, a great (surface) pressure is exerted on the contact points of the tray and the frame (bosses) because the area of the contact points is small. As a result, concave plastic deformations may be generated following (affected by) the shapes of the bosses, or the bosses formed on the frame may be broken.

In recent years and continuing, the below-described measure is generally taken to reduce the plastic deformation and the breakage of bosses. That is, by providing bosses 454a (FIGS. 7A and 7B) and 454b (FIG. 7B) each being substantially an elongated circle in a plan view (when viewed from the $Z_1$ direction as in FIG. 7B), the area of contact between the tray and the frame (bosses) is increased so as to reduce the pressure applied to the contact points when an external force is exerted thereon.

In such a case, however, the area of contact between the tray and the frame (bosses) becomes large at the time of driving the tray so as to increase sliding resistance. This may result in problems such as a shortened useful service life of the entire loading mechanism and an increase in power consumption due to a large load on the tray-driving motor.

SUMMARY OF THE INVENTION

Accordingly, it is a general object of the present invention to provide a loading mechanism in which the above-described disadvantages are eliminated, a drive unit including such a loading mechanism, and an information processing apparatus including such a drive unit.

A more specific object of the present invention is to provide a loading mechanism that is less subject to breakage and has a long useful service life.

Another more specific object of the present invention is to provide a loading mechanism including a tray with increased rigidity so as to prevent the disengagement of rail grooves from rails or the breakage of the tray itself even if an external force is applied to the tray at the time of unloading, the loading mechanism being realized without loss of its assembling efficiency or an increase in the number of components.

Yet another more specific object of the present invention is to provide a drive unit and an information processing apparatus that can be stably used for a long period of time.

The above objects of the present invention are achieved by a loading mechanism for loading an information recording medium in a predetermined position and unloading the information recording medium therefrom, the loading mechanism including: a frame; a tray on which the information recording medium is placeable in a predetermined position, the tray being movable in first and second opposite directions between a first position where the information recording medium is contained completely inside the frame and a second position where the information recording medium is exposed completely outside the frame, the tray including a groove part extending along the first and second opposite directions; and at least three projections arranged on the frame at predetermined intervals along the first and second opposite directions, the projections including first and-second guide and support parts forming first and second ends of the arrangement of the projections, the first and second guide and support parts coming into substantially point or linear contact with the groove part of the tray so as to guide and support the tray when the tray is in the second position.

According to the above-described loading mechanism, the projections are in substantially point or linear contact with the groove part. Therefore, sliding resistance is reduced compared with the case where the projections are in surface contact with the groove part. Accordingly, in the case of, for instance, driving the tray back and forth using a motor, the reduction in sliding resistance decreases the load on the motor, so that power consumption can be reduced and the motor can enjoy a longer useful service life. Further, if an external force is exerted on the tray in the second position so that the groove part of the tray or the frame is deformed, at least three projections are in substantially point or linear contact with the tray. Therefore, compared with the case where the tray is in contact with the frame at two points, the surface pressure exerted on the contact surface between the projections and the groove part is reduced. Accordingly, it is possible to prevent the breakage of the first and second guide and support parts. Further, the deformation of the projections is controlled, so that the detachment of the tray from the frame can be prevented. The above-described loading mechanism can enjoy a longer useful service life compared with the conventional loading mechanism.

The above objects of the present invention are also achieved by a loading mechanism for loading an information recording medium in a predetermined position and unloading the information recording medium therefrom, the loading mechanism including: a tray on which the information recording medium is placeable in a predetermined position, the tray including at least three projections arranged along first and second opposite directions, the projections including first and second projections forming first and second ends of the arrangement of the projections; and a frame including a guide groove that guides the projections of the tray, the guide groove extending along the first and second opposite directions, wherein the tray is movable in the first and second opposite directions between a first position where the information recording medium is contained completely inside the frame and a second position where the information recording medium is exposed completely outside the frame, and the first and second projections come into substantially point or linear contact with the groove part of the tray when the tray is in the second position.

According to the above-described loading mechanism, the same effects as described above can be produced.

The above objects of the present invention are also achieved by a drive unit performing at least information reproduction among information recording on, information reproduction from, and information erasure from an information recording medium, the drive unit including: a main body; and any of the above-described loading mechanisms according to the present invention, the loading mechanism being attached to the main body, wherein specific processing including the information reproduction is performed on the information recording medium in the first position; and the information recording medium is placed on or removed from the tray in the second position.

The above-described drive unit includes any of the above-described loading mechanisms according to the present invention. Therefore, the above-described drive unit can be used stably for a long period of time.

The above objects of the present invention are also achieved by an information processing apparatus including: the above-described drive unit according to the present invention; an input device inputting information; a display unit displaying information; a storage part storing information; and a control part controlling an operation of the information processing apparatus.

The above-described information processing apparatus includes the above-described drive unit according to the present invention. Therefore, the above-described information processing apparatus can be used stably for a long period of time.

The above objects of the present invention are also achieved by a loading mechanism including: a tray for transporting an optical disk, the tray including a rail groove and a disk placement surface on which the optical disk is placeable; a frame including a rail engaging the rail groove of the tray, and a drive mechanism for driving the tray in first and second opposite directions, the drive mechanism driving the tray so that the tray slides on the rail so as to be ejected in the first direction at a time of unloading the tray; and a rib provided on at least one of first and second opposite surfaces of a rear part of the tray, the rear part including a portion of the tray which portion remains inside the frame when the tray is ejected, the first and second opposite surfaces of the rear part being parallel to the disk placement surface of the tray.

The above objects of the present invention are also achieved by a loading mechanism including: a tray for transporting an optical disk, the tray including a rail groove and a disk placement surface on which the optical disk is placeable; and a frame including a rail engaging the rail groove of the tray, and a drive mechanism for driving the tray in first and second opposite directions, the drive mechanism driving the tray so that the tray slides on the rail so as to be ejected in the first direction at a time of unloading the tray, wherein the rail groove includes first and second linear projections each extending along the first and second opposite directions, the second linear projection being closer to a center of the tray than the first linear projection is, and a dimension of the first linear projection in a direction perpendicular to the disk placement surface of the tray is maximized within a range that prevents the first linear projection from interfering with the frame so that an overlap between the rail and the first linear projection increases.

The above objects of the present invention are also achieved by a loading mechanism including: a tray for transporting an optical disk, the tray including a rail groove and a disk placement surface on which the optical disk is placeable; and a frame including a rail engaging the rail groove of the tray, and a drive mechanism for driving the tray in first and second opposite directions, the drive mechanism driving the tray so that the tray slides on the rail so as to be ejected in the first direction at a time of unloading the tray, the frame further including a plurality of tray holding parts for preventing the tray from being lifted in a direction away from the frame, wherein a projection in a direction away from the frame and perpendicular to the disk placement surface of the tray is provided to the tray in at least a region that opposes any of the tray holding parts when the tray is ejected.

The above objects of the present invention are also achieved by a loading mechanism including: a tray for transporting an optical disk, the tray including a rail groove including a linear projection to which a rack is provided; a frame including a rail engaging the rail groove of the tray, and a drive mechanism for driving the tray in first and second opposite directions, the drive mechanism including a loading motor and a loading gear engaging the rack of the tray, the drive mechanism driving the tray so that the tray slides on the rail so as to be ejected in the first direction at a time of unloading the tray; and an auxiliary rack provided to an end part in the second direction of the linear projection of the rail groove of the tray.

According to the above-described loading mechanisms, even if an external force is applied to the tray when the tray is ejected, the tray can prevent the rail groove from disengaging from the rail of the frame. Further, it is possible to provide the tray with tolerance to strong impacts without complicating its structure or making its assembling operation difficult. Accordingly, the above-described loading mechanisms are less subject to breakage and can enjoy a longer useful service life compared with the conventional loading mechanism.

The above objects of the present invention are further achieved by an optical disk drive unit including: a main body; and any of the above-described loading mechanisms according to the present invention, the loading mechanism being attached to the main body.

The above-described optical disk drive unit includes any of the above-described loading mechanisms according to the present invention. Therefore, the above-described optical disk drive unit can be used stably for a long period.

BRIEF DESCRIPTION OF THE DRAWINGS

Other objects, features and advantages of the present invention will become more apparent from the following detailed description when read in conjunction with the accompanying drawings, in which:

FIG. 1 is an exploded perspective view of a conventional optical disk drive unit;

FIGS. 17A and 17B are cross-sectional views of the disk unit including a third variation of the tray according to the second embodiment of the present invention;

FIG. 18 is a schematic exploded view of the drive unit, showing a top surface of the tray according to a fourth variation and a longitudinal section of the loading base, according to the second embodiment of the present invention;

DETAILED DESCRIPTION OF THE PREFERRED EMBODIMENTS

A description is given below, with reference to the accompanying drawings, of embodiments of the present invention.

First Embodiment

Figure 8:
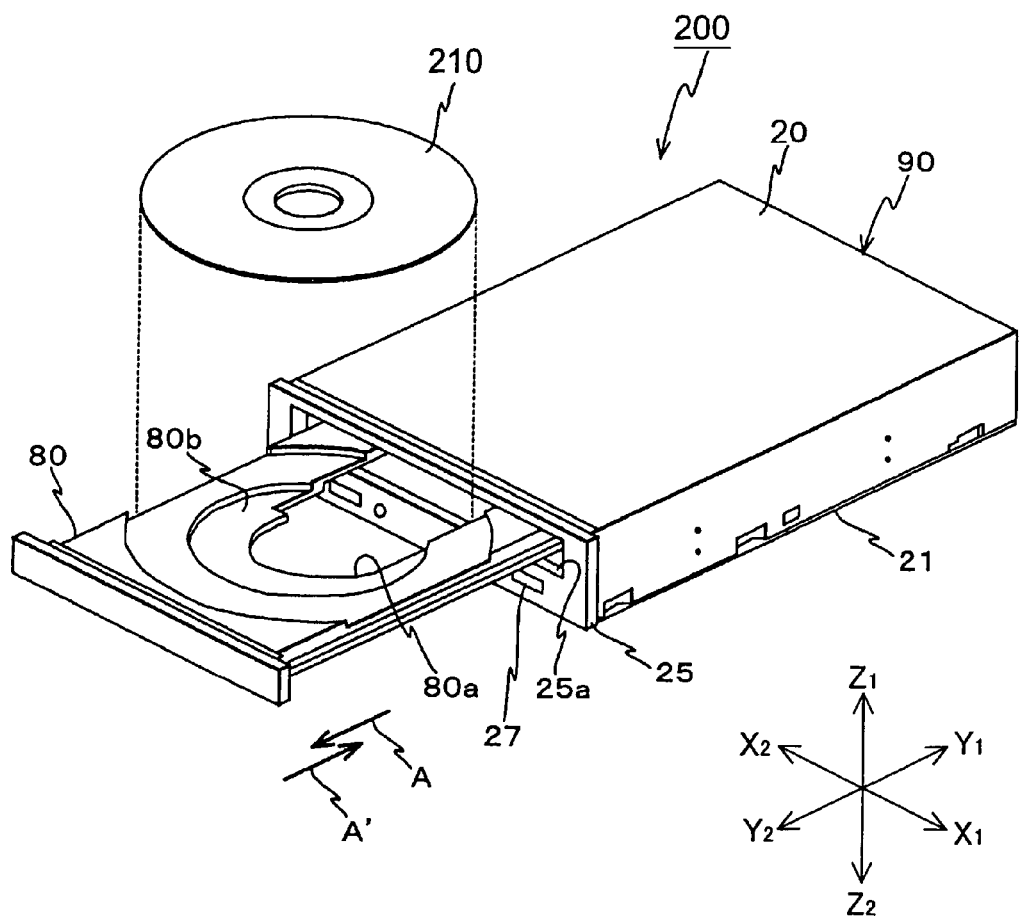
FIG. 8 is a schematic perspective view of a drive unit according to a first embodiment of the present invention.

A description is given, with reference to FIGS. 8 through 13C, of a first embodiment of the present invention. In the following description, the same elements as those of FIGS. 6A through 7B are referred to by the same numerals, and a description thereof is omitted. FIG. 8 is a schematic perspective view of a drive unit 200 including a loading mechanism according to the first embodiment of the present invention. The drive unit 200 includes a tray 80 and a drive unit main body 90 containing an optical pickup (not shown in the drawing) The tray 80 can accommodate an optical disk 210 as a CD-type information recording medium such as a CD-R (CD-recordable) or a CD-RW (CD-rewritable). The tray 80 is containable in the drive unit main body 90 so that the optical pickup records information on the optical disk 210 placed on the tray 80, and reproduces or erases information recorded on the optical disk 210.

The tray 80 is adapted so as to be movable in the directions indicated by A and A' (that is, along the Y-axis) in FIG. 8. The tray 80 is used for loading, for instance, the optical disk 210 into the main body 90 and transporting (unloading) the optical disk 210 out of the main body 90. The tray 80 is formed of, for instance, plastic. A substantially circular stepped concave part 80b is formed on the upper surface of the tray 80. The concave part 80b includes an outer (higher) concave portion for receiving, for instance, an optical disk such as a 12 cm CD and an inner (lower) concave portion for receiving, for instance, an optical disk such as a 8 cm CD. Hereinafter, these concave portions are collectively referred to as a "disk seating part 80b."

Figure 11A:
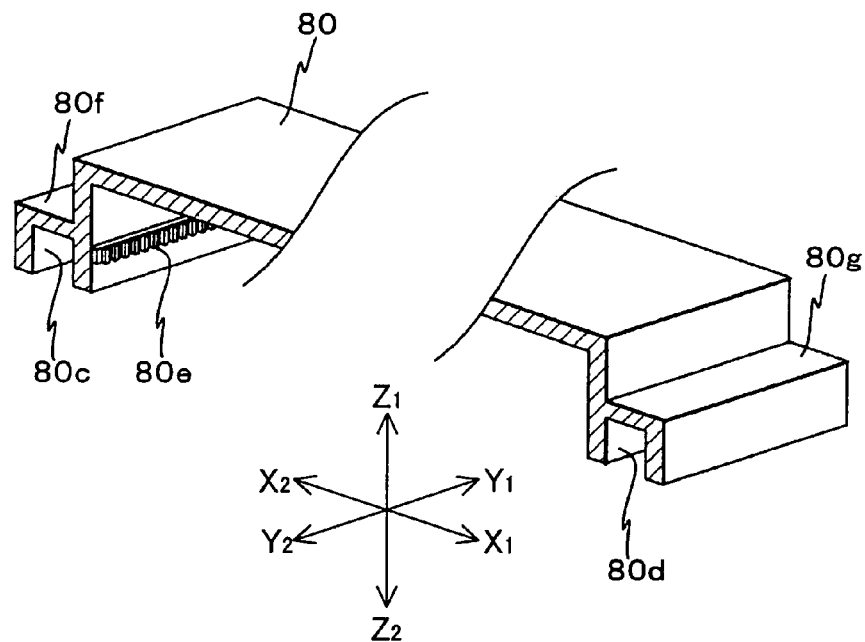
FIG. 11A is a perspective view of a section of the tray, showing groove parts and a rack thereof, according to the first embodiment of the present invention.

Further, an opening 80a is formed in the tray 80 so as to penetrate therethrough along the Z-axis. FIG. 11A is a perspective view of a cross-section of the tray 80. As shown in FIG. 11A, guide members 80f and 80g are formed protruding from the $X_2$- and $X_1$-side ends, respectively, of the tray 80 and extending along the Y-axis. The groove parts 80c and 80d are formed at the bottom (underside) of the guide members 80f and 80g, respectively, and extending along the Y-axis. Further, a rack 80e is formed on the inner surface of the $X_2$ sidewall of the tray 80 so as to extend along the Y-axis. The opening 80a is shaped so as to prevent the tray 80 from interfering with a turntable 32 (FIG. 9) and the optical pickup of the main body 90 when the tray is contained inside the main body 90.

Referring back to FIG. 8, the drive unit main body 90 includes a flat bottom plate 21, a cover 20 covering the upper face of the bottom plate 21 from the four ($X_1$, $X_2$, $Y_1$, and $Z_1$) directions, and a front panel (also referred to as a front bezel) 25 covering the $Y_2$ side of the cover 20.

Each of the cover 20 and the bottom plate 21 is formed of a metal plate so as to withstand an external impact applied to the main body 90. The front panel 25 is formed of, for instance, plastic. A rectangular opening 25a is formed substantially in the center of the front panel 25. An eject button 27 for loading and unloading the tray 80 is provided in the vicinity of the opening 25a on the front panel 25. The tray 80 is adapted to be movable between the inside and outside of the main body 90 through the opening 25a. When the eject button 27 is pressed, that information is transmitted to a controller (not shown in the drawing) so that the controller drives a motor 41 (FIG. 9) in accordance with a predetermined standard.

Figure 9:
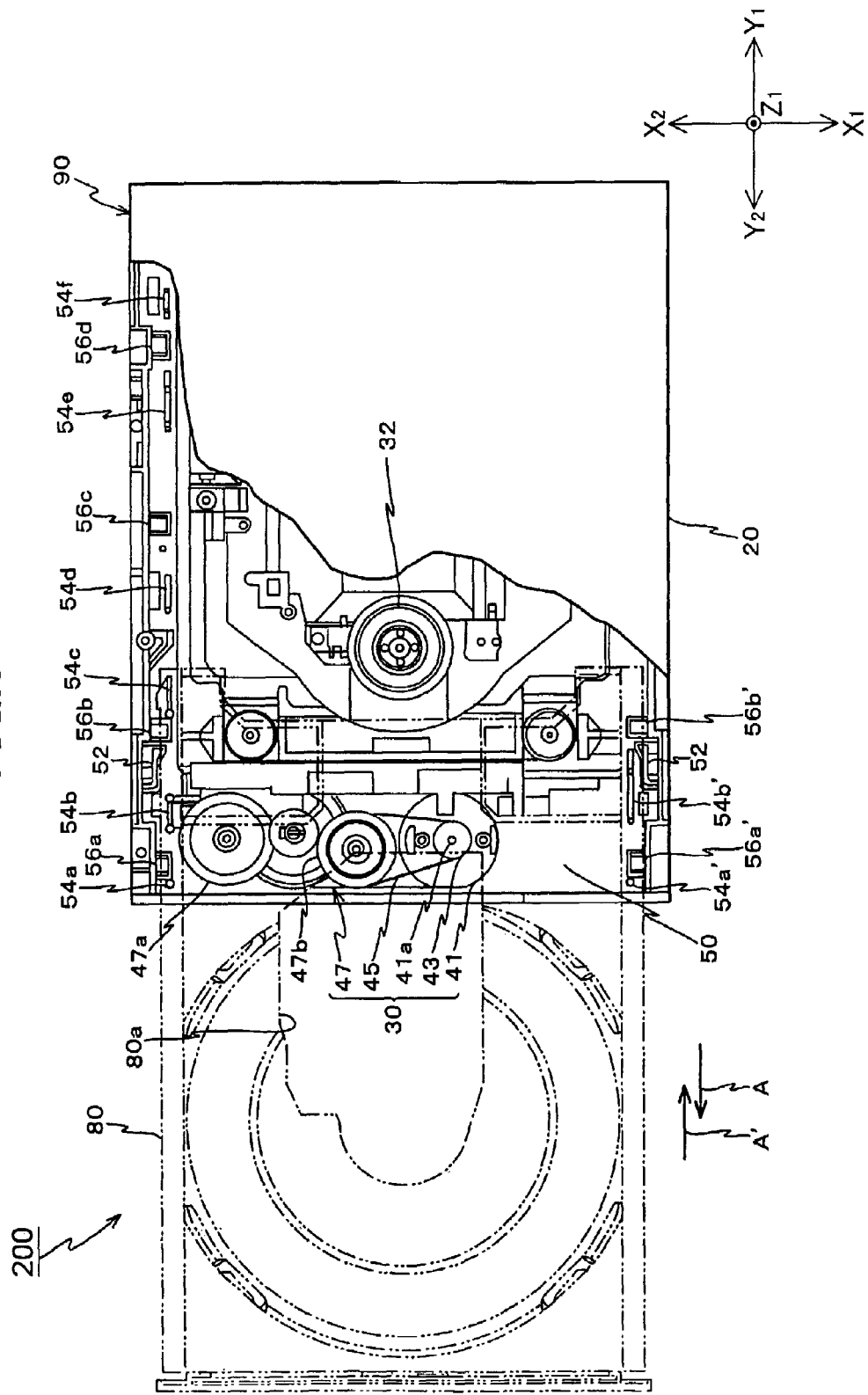
FIG. 9 is a top plan view of the drive unit, in which a cover thereof is shown partially removed, according to the first embodiment of the present invention.

FIG. 9 is a top plan view of the drive unit 200, in which the cover 20 is shown partially removed for purpose of description. As is seen from FIG. 9 showing the inside of the main body 90, a tray driving mechanism 30 as a drive mechanism for driving the tray 80 in the A and A' directions, the turntable 32 for rotating the optical disk 210, and the frame 50 on which the tray driving mechanism 30 and the turntable 32 are provided are contained in the space defined by the bottom plate 21, the cover 20, and the front panel 25. The turntable 32 is rotated by a spindle motor (not shown in the drawing).

The tray driving mechanism 30 includes the motor 41 that rotates clockwise or counterclockwise about a rotary shaft 41a, a pulley 43 fixed to the rotary shaft 41a of the motor 41, a gear train 47 composed of a plurality of gears provided in the vicinity of the motor 41, and a driving belt 45 that transmits the rotation of the pulley 43 to one of the gears of the gear train 47 (a gear 47b). A gear 47a, which is positioned furthest in the $X_2$ direction of the gears of the gear train 47, engages the rack 80e provided to the tray 80 and functions as a pinion.

In the tray driving mechanism 30, the rotary shaft 41a of the motor 41 rotates to drive each gear of the gear train 47 via the pulley 43 and the driving belt 45. The gear 48a positioned on the $X_2$-side end is rotated counterclockwise or clockwise so as to drive the tray 80 in the A or A' direction via the rack 80e. In this case, the pulley 43, the driving belt 45, and the gear train 47 compose a deceleration mechanism that decelerates the rotation of the motor 41 (or, more exactly, the rotary shaft 41a) and transmits the decelerated rotation to the gear 48a and the rack 80e.

Referring to FIG. 9, when the tray 80 is driven a predetermined distance in the A direction to reach the position indicated by imaginary (double-dot chain) lines, a stopper 52 provided in the vicinity of the gear train 47 engages a cutout (not shown in the drawing) formed on the $X_2$-side face of the tray 80 so as to prevent the tray 80 from moving further in the A direction. In this state, the disk seating part 80b of the tray 80 is exposed completely outside the main body 90 and the frame 50. As a result, a user can place the optical disk 210 on the disk seating part 80b or remove the optical disk 210 from the disk seating part 80b. Accordingly, hereinafter, the position of the tray 80 indicated by the imaginary lines in FIGS. 9 and 10 is referred to as a "disk placement/removal position" as a second position.

Figure 10:
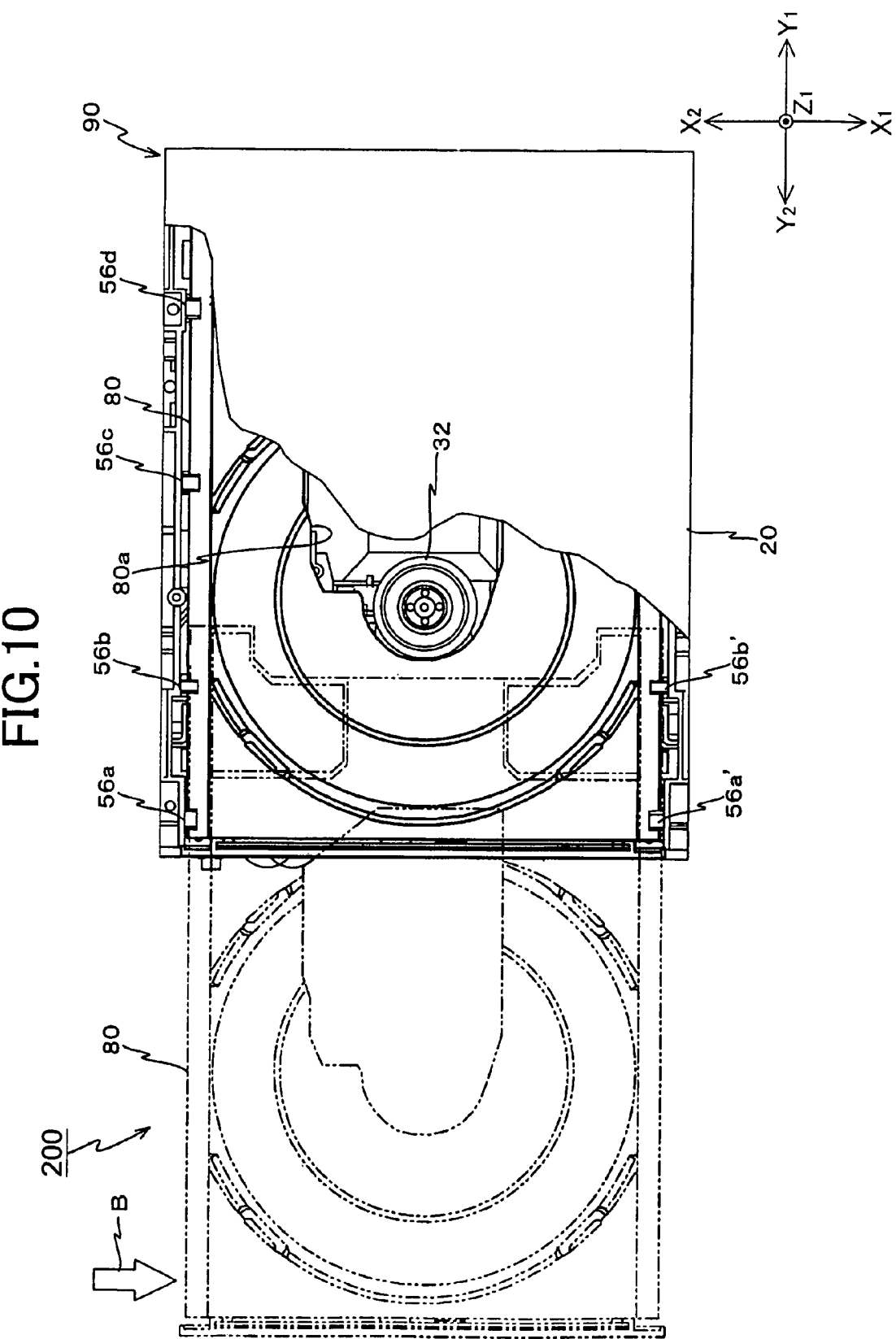
FIG. 10 is a diagram for illustrating a disk placement/removal position and a recording/reproduction position of a tray of the drive unit according to the first embodiment of the present invention.

When the tray 80 moves in the A' direction to the maximum extent to be contained completely inside the main body 90 and the frame 50, the turntable 32 is positioned in the space corresponding to the opening 80a of the tray 80, being slightly separated from the wall defining the opening 80a on the $Y_2$ side thereof as shown in FIG. 10. As a result, when the optical disk 210 is placed on the disk seating part 80b, it is possible to record information on and reproduce or erase information from the optical disk 210. Accordingly, hereinafter, the position of the tray 80 indicated by the solid lines in FIG. 10 is referred to as a "recording/reproduction position" as a first position.

The frame 50 is formed of a member having a shape larger than that of the tray 80 on which the optical disk 210 is placed. The frame 50 may employ a variety of shapes such as a plate-like shape, a frame-like shape, and a box-like shape. If the frame 50 is a plate-like member, "contained completely inside the frame 50" means that the entire optical disk 210 placed in a predetermined position on the tray 80 is located on the upper surface of the plate-like member, and "exposed completely outside the frame 50" means that the optical disk 210 is removed completely from the upper surface of the plate-like member. If the frame 50 is a frame-like or box-like member, "contained completely inside the frame 50" means that the optical disk 210 is contained completely in the space formed inside the frame-like or box-like member, and "exposed completely outside the frame 50" means that the optical disk 210 is removed completely from the space formed inside the frame-like or box-like member.

The turntable 32 is driven by the spindle motor (not graphically represented) to rotate the optical disk 210 placed on the tray 80 in the recording/reproduction position. When the tray 80 reaches the recording/reproduction position, the optical disk 210 is automatically held between the turntable 32 and a rotating mechanism (not graphically represented) called a disk clamper provided to the ceiling of the cover 20. Then, the optical disk 210 is rotated about the Z-axis as an axis of rotation by the turntable 32.

Referring back to FIG. 9, the mechanisms and components forming the drive unit main body 90, such as the tray driving mechanism 30, the turntable 32, and the optical pickup (not shown in FIG. 9) are provided on the frame 50. Bosses 54a through 54f as a plurality of (six in this embodiment) projections protruding in the $Z_1$ direction are provided in a straight line substantially parallel to the Y-axis in the vicinity of the $X_2$-side end of the frame 50. The bosses 54a through 54f and the frame 50 are formed integrally with each other by, for instance, injection molding using a mold. In order for the tray 80 to slide stably toward the disk placement/removal position, the bosses 54a through 54f are arranged at decreasing intervals in the $Y_2$ direction toward the disk placement/removal position so that the tray 80 comes into contact with as many bosses as possible when the tray 80 is in the disk placement/removal position. Further, ribs 56a through 56d, each having a plane surface in the X-Y plan view of FIG. 9, for controlling the tray 80 in the $Z_1$ and $Z_2$ directions are formed integrally with the frame 50 in a straight line substantially parallel to the Y-axis in the vicinity of the bosses 54a through 54f.

Figure 11B:
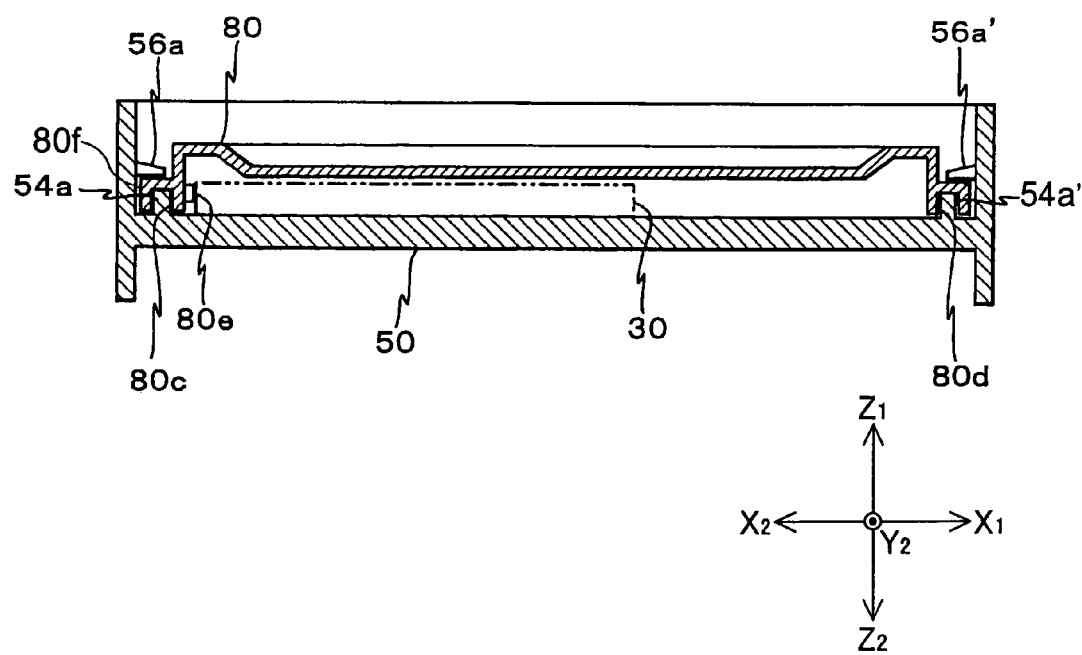
FIG. 11B is a cross-sectional view of the drive unit, showing cross sections of the tray and a frame thereof, according to the first embodiment of the present invention.

A more detailed description is given below, with reference to FIG. 11B, of the bosses 54a through 54f and the ribs 56a through 56d. FIG. 11B is a cross-sectional view of the drive unit 200, showing cross sections of the tray 80 and the frame 50. As shown in FIG. 11B, the boss 54a, for instance, is in contact with the upper ($Z_1$-side) surface and the $X_1$- and $X_2$-side surfaces of the $X_2$-side groove part 80c of the tray 80. The same applies to the remaining bosses 54b through 54f. The rib 56a is in contact with or positioned slightly above the top surface of the-guide member 80f of the tray 80. The same applies to the remaining-ribs 56b through 56d.

Accordingly, the tray 80 is adapted to be movable or slidable in the A and A' directions of FIGS. 8 and 9 along the bosses 54a through 54f (using the bosses 54a through 54f as guides). Further, the bosses 54a through 54f and the ribs 56a through 56d prevent the tray 80 from disengaging (being detached) from the frame 50, of which a description is given below.

Figure 12:
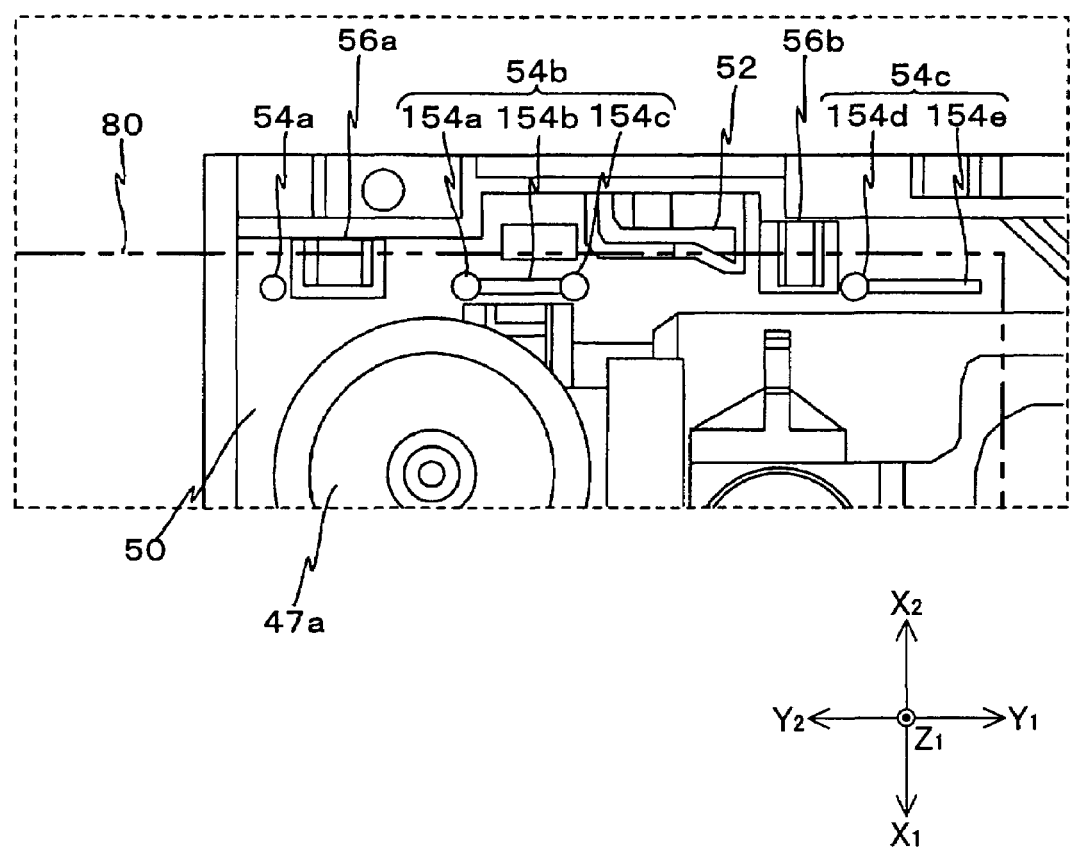
FIG. 12 is an enlarged view of part of the frame in the vicinity of bosses according to the first embodiment of the present invention.

A more detailed description is given below, with reference to FIG. 12, of the three bosses 54a through 54c provided in the vicinity of the $Y_2$-side end of the frame 50. FIG. 12 is an enlarged partial view of the frame 50.

Referring to FIG. 12, the boss 54a, which is provided furthest in the $Y_2$ direction as a first guide support part, is circular in a plan view (when viewed from the $Z_1$ direction) and shaped like a cylinder (or a pin). The boss 54b provided next to the boss 54a includes: cylindrical (pin-like) parts 154a and 154c forming both ends of the boss 54b; and a flat plate-like connecting part 154b connecting the cylindrical parts 154a and 154c. The boss 54c, which is provided as a second guide support part on the $Y_1$ side of the boss 54b, includes: a cylindrical (pin-like) part 154d forming one end (the $Y_2$-side end) of the boss 54c; and a flat plate-like part 154e connected to the cylindrical part 154d. The $X_2$-side groove part 80c of the tray 80 is in line contact with at least the boss 54a, the cylindrical parts 154a and 154c of the boss 54b, and the cylindrical part 154d of the boss 54c. By this configuration, the tray 80 is guided along the Y-axis with the position of the tray 80 being determined (controlled) in the $X_1$-$X_2$ direction.

Meanwhile, referring to FIG. 9, bosses 54a', 54b' . . . and ribs 56a', 56b' . . . are provided in the vicinity of the $X_1$-side end of the frame 50. With respect to the bosses 54a', 54b', . . . and the ribs 56a', 56b', . . . , normally, only the top surface of each of the bosses 54a', 54b', . . . is in contact with the $X_1$-side groove 80d of the tray 80 as shown typically by the boss 54a' in FIG. 11B. This is because the bosses 54a', 54b', . . . and the ribs 56a', 56b', . . . are employed to prevent the tray 80 from being detached from the frame 50 when the tray 80 comes near to disengaging from the frame 50 by the effect of an external force (described below). Unlike the bosses 54a through 54f, the bosses 54a', 54b' . . . are not employed to guide the tray 80.

Next, a brief description is given of the operation of the drive unit 200, focusing on the operation of its loading mechanism.

When a user presses the eject button 27 provided on the front panel 25 shown in FIG. 8, the rotary shaft 41a of the motor 41 is rotated by the controller in a predetermined direction, for instance, counterclockwise, as previously described. In this instance, the rotation of the rotary shaft 41a of the motor 41 is transmitted through the pulley 43, the driving belt 45, and the gear train 47 (the gears except for the gear 47a) so as to rotate the gear 47a engaging the rack 80e of the tray 80 counterclockwise. As a result, the tray 80 is driven in the A direction of FIG. 9. When the tray 80 is driven a predetermined distance, the stopper 52 engages the cutout formed on the $X_2$-side face of the tray 80 so as to position the tray 80 in the disk placement/removal position. Once the tray 80 is positioned in the disk placement/removal position, a sensor or a limit switch (not graphically represented) detects the positioning of the tray 80, and transmits a detection signal to the controller, which then stops the motor 41.

Next, when the user places the optical disk 210 on the disk seating part 80b of the tray 80, and thereafter, presses the eject button 27 or pushes the tray 80 slightly in the A' direction with the tray 80 being in the disk placement/removal position, these operations are transmitted to the controller so that the controller rotates the motor 41 in the direction opposite to the predetermined direction, in this instance, clockwise. As a result, the gear 48a is rotated clockwise so as to drive the tray 80 in the A' direction.

When the tray 80 is moved to the recording/reproduction position indicated by the solid lines in FIG. 10, the turntable 32 substantially coincides with the center circular opening of the optical disk 210. This state is referred to as a loading state. At this point, the turntable 32 is raised to a predetermined position by a drive mechanism (not graphically represented) so that the optical disk 210 is held between the turntable 32 and the disk clamper. Then, at the same time that the controller rotates the spindle motor, the optical pickup emits a laser beam. As a result, the information in the lead-in region of the optical disk 210 is read through detection of the reflected light from the optical disk 210 and conversion of the detected light into an electrical signal. Thereafter, the controller stops the turntable 32.

Figure 13A:
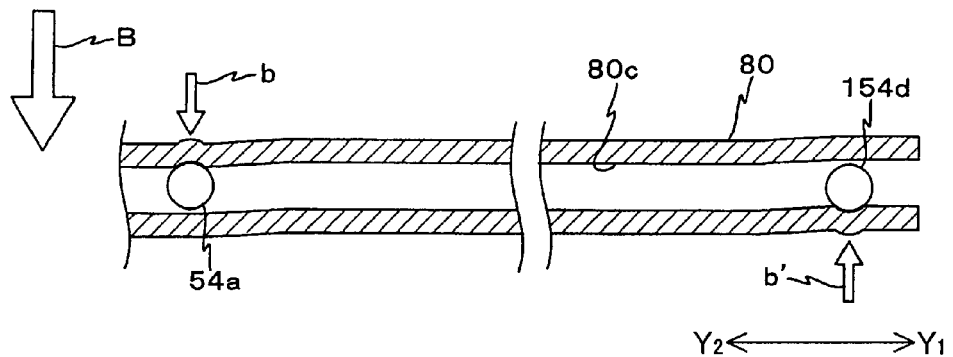
FIG. 13A is a diagram showing a deformed state of the groove part when an external force is exerted on the tray.

If, during the above-described operation, an external force indicated by arrow B in FIG. 10, for instance, is exerted on the tray 80 due to some factor before the user places the optical disk 210 on or removes the optical disk 210 from the tray 80 after the tray 80 is located in the disk placement/removal position, a force resulting from the external force is to be exerted on the bosses 54a through 54c guiding and supporting the tray 80. Specifically, as shown in FIG. 13A, a force indicated by arrow b is exerted in the same direction as the B direction on the boss 54a, while a force indicated by arrow b' is exerted in the direction opposite to the B direction on the cylindrical part 154d of the boss 54c.

As previously described, each of the bosses 54a through 54c includes a curved surface that comes into linear contact with the tray 80, and the tray 80 is formed of plastic, which is apt to undergo plastic deformation. Therefore, the exertion of the external force causes the parts of the tray 80 coming into contact with the bosses 54a through 54c to have plastic deformation conforming to the shapes of the bosses 54a through 54c. This plastic deformation causes a sudden increase in the area of contact so as to reduce surface pressure on each contact part. That is, the external force exerted on the tray 80 is distributed to the bosses 54a through 54f so that the breakage of the bosses 54a through 54f from their roots can be prevented to the maximum extent possible.

Figure 13B:
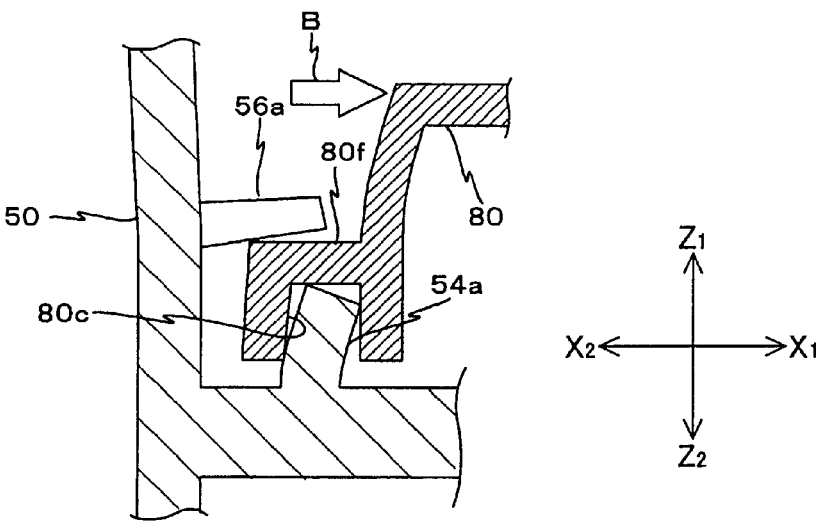
FIG. 13B is a diagram showing a deformed state of each of the boss and a rib when the external force is exerted on the tray.
Figure 13C:
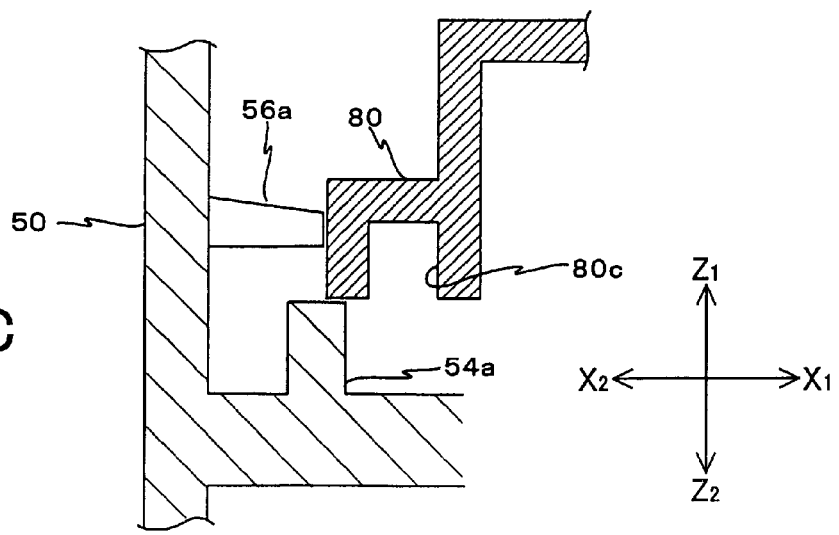
FIG. 13C is a diagram showing a state where the action of a force resulting from the external force exerted on the boss is such that the tray is detached from the frame, according to the first embodiment of the present invention.

If great force is exerted on each of the bosses 54a through 54f when the external force indicated by arrow B is exerted on the tray 80, each of the bosses 54a through 54c deforms as shown in FIG. 13B so as to generate a force to move the tray 80 in the upper right direction (the direction between the $X_1$ and $Z_1$ directions) in FIG. 13B. This generated force is exerted to cause the guide member 80f to push and bend the rib 56a provided to the frame 50 upward, which, in the worst case, may result in the disengagement of the tray 80 from the frame 50 as shown in FIG. 13C. Therefore, according to this embodiment, the surface pressure applied on each of the bosses 54a through 54c is minimized in order to prevent such a case from occurring as previously described. As a result, the bosses 54a through 54c are prevented from deforming so that the tray 80 can be prevented from being detached from the frame 50.

As is apparent from the above description, according to this embodiment, the tray 80 and the bosses 54a through 54c form a loading mechanism for loading the optical disk 210 in the recording/reproduction position and unloading the optical disk 210 to the disk placement/removal position.

According to the loading mechanism of this embodiment, the tray 80 is adapted to be movable in predetermined sliding directions (in the $Y_1$ and $Y_2$ directions) between the first position (recording/reproduction position) where the optical disk 210 placed on the upper surface of the tray 80 (the disk seating part 80b) is contained completely inside the frame 50 and the second position (disk placement/removal position) where the optical disk 210 placed on the disk seating part 80b is exposed completely outside the frame 50. The groove part 80c provided to the tray 80 so as to extend along the Y-axis is adapted to come into substantially linear contact with the bosses 54a through 54c provided on the frame 50 at predetermined intervals along the Y-axis. Therefore, compared with the conventional loading mechanism, the number of contacts (contact points) between the tray 80 and the frame 50 increases in normal operation of the drive unit 200. However, since each of the bosses 54a through 54c comes into substantially linear contact with the groove part 80c, sliding resistance is reduced compared with the case where each boss and the groove comes into surface contact. Accordingly, a reduced load is applied to the motor 41 for driving the tray 80 back and forth, so that a decrease in power consumption and a longer useful service life of the motor 41 can be realized. Further, if an external force is exerted on the tray 80 in the disk placement/removal position, the exerted external force causes the groove part 80c of the tray 80 or the frame 50 to deform. Since all of the three bosses 54a through 54c are in substantially point or linear contact with the tray 80, the surface pressure exerted on each contact between the bosses 54a through 54c and the groove part 80c is reduced compared with the case where the tray and the frame are in contact with each other at two points. Accordingly, the breakage of the boss 54a or 54c can be prevented. Further, since the bosses 54a and 54c are prevented from deforming, the detachment of the tray 80 from the frame 50 can be prevented.

Figure 14A:
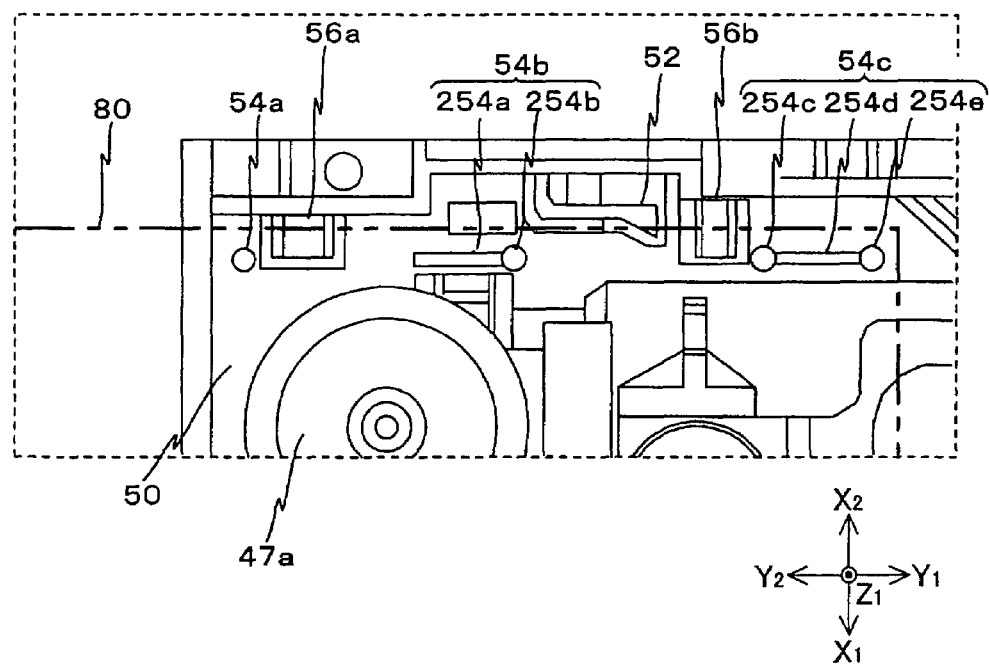
FIG. 14A is a diagram showing a variation of boss arrangement.

In this embodiment, the arrangement of the bosses 54a through. 54c as shown in FIG. 14A is also employable.

In the variation of FIG. 14A, the bosses 54a through 54c are provided in a cylindrical part arrangement different from that of FIG. 12. Specifically, while the boss 54a remains the same, the boss 54b includes a cylindrical part 254b forming the $Y_1$-side end of the boss 54b and a plate-like part 254a provided on the $Y_2$ side of the cylindrical part 254b, and the boss 54c includes cylindrical parts 254c and 254e forming the $Y_2$- and $Y_1$-side ends, respectively, of the boss 54c and a plate-like connecting part 254d connecting the cylindrical parts 254c and 254e. The boss 54a and the cylindrical part 254e of the boss 54c are provided so as to be able to hold the tray 80 positioned in the disk placement/removal position indicated by the imaginary (double-dot chain) line in FIG. 14A with a substantially maximized distance between the boss 54a and the cylindrical part 254e.

By thus substantially maximizing the distance between the boss 54a and the cylindrical part 254e of the boss 54c, a force to be exerted on each of the bosses 54a through 54c can be reduced even if an external force (for instance, the external force indicated by arrow B in FIG. 10 as in the previous case) is exerted on the $Y_2$-side end of the tray 80 in the disk placement/removal position so as to generate a great moment. Accordingly, even in the case of employing a boss of a small diameter, its breakage can be prevented to the maximum extent possible.

In the above description of this embodiment, normally, all of the bosses 54a through 54c come into contact with the groove part 80c of the tray 80. However, the present invention is not limited to this specific configuration, and may employ a configuration as shown in FIG. 14B.

Figure 14B:
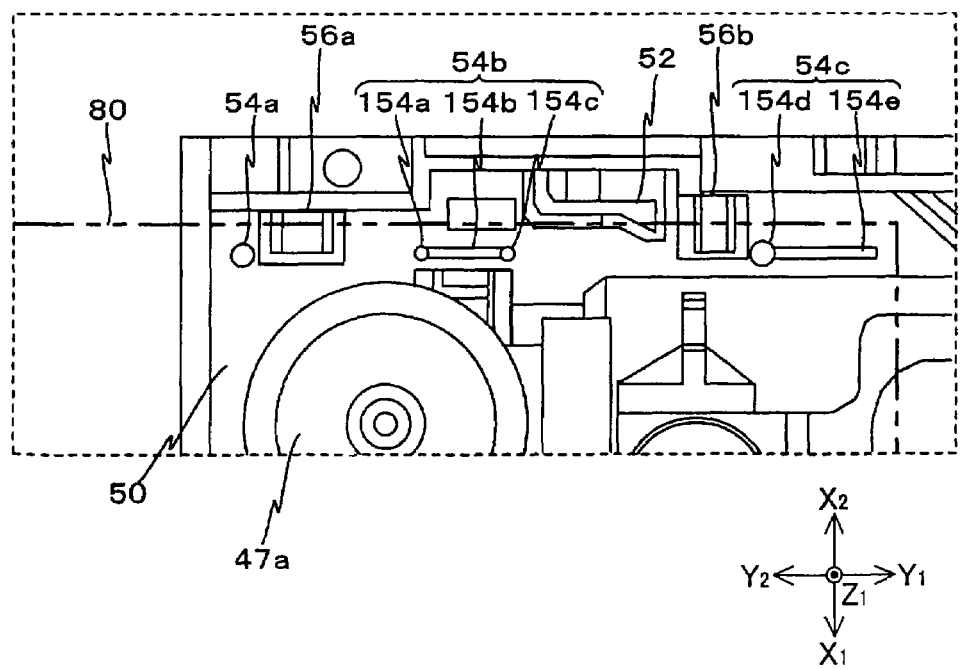
FIG. 14B is a diagram showing a variation of a boss shape, according to the first embodiment of the present invention.

Referring to FIG. 14B, the parts of the bosses 54a through 54c other than the cylindrical parts on both ends (that is, the boss 54a and the cylindrical part 154d of the boss 54c) may have a reduction in the $X_1$-$X_2$ dimension so as not to come into contact with the inner walls of the groove part 80c in a normal state insofar as the reduction remains within the range of the elastic deformation of the tray 80 (FIG. 13A) and the range of deformation of the bosses 54a and 54c.

In this case, the following effects can be produced.

That is, in a normal state, the tray 80 comes into linear contact only with the two cylindrical parts of the bosses 54a through 54c, that is, the boss 54a and the cylindrical part 154d of the boss 54c. Accordingly, when the tray 80 is driven back and forth in the A and A' directions of FIGS. 8 and 9, the sliding resistance can be reduced to a very low value, and the load applied to the motor 41 can be minimized.

On the other hand, if an external force having an X-axis component (for instance, the external force indicated by arrow B in FIG. 10 as in the previous case) is exerted on the tray 80 in the disk placement/removal position, the cylindrical parts on both ends of the bosses 54a through 54c, that is, the boss 54a and the cylindrical part 154d of the boss 54c, deform so that the inner walls of the groove part 80c of the tray 80 come into contact with the cylindrical parts 154a and 154c between the cylindrical parts on both ends. In this case, the cylindrical parts 154a and 154c may come into point, linear, or surface contact with the groove part 80c. Thus, the number of contacts between the groove part 80c and the bosses 54a through 54c increases when an external force is exerted on the tray 80. As a result, the force exerted on each contact (contact part) is reduced. This prevents further deformation of each of the bosses 54a through 54c so that the breakage of the bosses 54a through 54c and the detachment of the tray 80 from the frame 50 can be avoided.

It is possible to employ the combination of the configurations of FIGS. 14A and 14B. That is, the cylindrical parts of the bosses 54a through 54c positioned furthest in the $Y_2$ and $Y_1$ directions, respectively, that is, the boss 54a and the cylindrical part 254e of the boss 54c in FIG. 14A, may be provided so as to substantially maximize the distance therebetween, and the cylindrical parts (154a and 154c in FIG. 14B) of the boss 54b between the bosses 54a and 54c may be provided so as not to come into contact with the groove part 80c in a normal state. As a result, a loading mechanism realizing a long useful service life by reducing sliding resistance and a force exerted on each boss can be provided.

In this embodiment, the groove 80c of the tray 80 and the bosses 54a through 54c come into linear contact with each other. Alternatively, the groove 80c of the tray 80 and the bosses 54a through 54c may come into point contact with each other. In this case, each of the bosses 54a through 54c may include a spherical end or an end having a shape close to a sphere.

In this embodiment, each of the bosses 54a and 54c includes a curved part (surface) in at least one of its $X_1$- and $X_2$-side surfaces. It is desirable that the curved surface have as large a radius of curvature as possible within a range that allows the bosses 54a and 54c to come into substantially point or linear contact with the groove part 80c. According to such a configuration, if an external force is exerted on the tray 80 in the disk placement/removal position, the groove part 80c comes into contact with the bosses 54a and 54c with a large area of contact when the exerted external force causes a slight deformation in the groove part 80c. As a result, the surface pressure applied on each contact point by the exerted external force can be reduced so that the breakage of the bosses 54a through 54c or the tray 80 and the detachment of the tray 80 from the frame 50 can be prevented effectively.

In this embodiment, the bosses 54a through 54c are formed separately on the frame 50 independent of one another. Alternatively, the present invention may employ such a configuration where three bosses are integrally formed with two of the bosses (for instance, pin-like bosses) being connected by the boss (plate-like projection) positioned therebetween.

The number of bosses employable is not limited to three as disclosed in this embodiment. Any number of bosses may be employed if the number is three or more.

In this embodiment, only the $X_2$-side groove part 80c of the tray 80 is adapted to come into linear contact with the bosses 54a through 54c, while the $X_1$-side groove part 80d is not adapted to come into linear contact with the bosses 54a', 54b', . . . . However, the present invention is not limited to this configuration, and may employ a configuration where only the $X_1$-side groove part 80d comes into linear contact with the bosses 54a', 54b', . . . . Further, both groove parts 80c and 80d may come into linear contact with the bosses 54a through 54c and the bosses 54a', 54b', . . . , respectively. In this case, the same configurations as those of the bosses 54a through 54c described above are employable for the bosses 54a', 54b' . . . on the $X_1$ side.

Further, in this embodiment, at least one of the bosses 54a through 54c includes a plate-like part (including a connecting part) for reinforcement. However, the bosses 54a through 54c may be formed only of cylindrical parts (pin-like parts).

In this embodiment, the bosses 54a through 54f and the bosses 54a', 54b', . . . are provided on the frame 50, and the tray 80 including the groove parts 80c and 80d slides along the bosses 54a through 54f and the bosses 54a', 54b', . . . . However, the present invention is not limited to this configuration. For instance, the frame 50 may include guide grooves, and the tray 80 may include projections that slide along the guide grooves. In this case, the same effects as described above can also be produced.

In this embodiment, the tray driving mechanism 30 using the motor 41 as a drive source is employed as a part that drives the tray 80. However, the present invention is not limited to this configuration. The tray 80 may be driven by a drive mechanism using an actuator other than a motor, or be moved manually. Further, the present invention may employ a configuration where the tray 80 has its opening and closing lock released by a user pressing the eject button 27 so as to pop out slightly from the drive unit main body 90, and the user manually draws the popped-out tray 80 out of the main body 90.

In this embodiment, the drive unit 200 and its loading mechanism support the optical disk 210 of a CD type. However, the present invention may also employ a drive unit that supports another type of optical disk such as a DVD-ROM, a DVD+RW, or a DVD+R, or at least two of these types of optical disks. Alternatively, the present invention may employ a drive unit that supports a DVD-R, a DVD-RW, or a DVD-RAM. That is, any drive unit that supports any type of optical disk is employable as long as the drive unit performs, of recording of information on, reproduction of information from, and erasure of information from the optical disk, at least the reproduction of information. Further, an information recording medium other than an optical disk is employable. That is, any type of information recording medium such as a cassette-type information recording medium is employable as long as the information recording medium is placeable on the tray 80, and loadable and unloadable using the tray 80.

Further, the drive unit 200 may be a "horizontal-type" drive unit whose disk-carrying surface coincides with a horizontal plane, or a "vertical-type" disk unit whose disk-carrying surface is vertical to a horizontal plane.

Thus, the loading mechanism of the first embodiment is less subject to breakage and can enjoy a long useful service life, and the drive unit 200 of the first embodiment can be used stably for a long period of time.

Second Embodiment

A description is given below of a second embodiment of the present invention. In the second embodiment, the same elements as those of FIGS. 1 through 5 are referred to by the same numerals, and a description thereof is omitted. The optical disk drive unit of the second embodiment includes a tray 1 and the loading base (frame) 2 previously described in FIGS. 1 through 5. The optical disk drive unit of the second embodiment is characterized by the configuration of the tray 1. Accordingly, in the second embodiment, only the configuration and the function of the tray 1 of the optical disk drive unit are described as variations, and a description of the loading base 2 is omitted.

Figure 15:
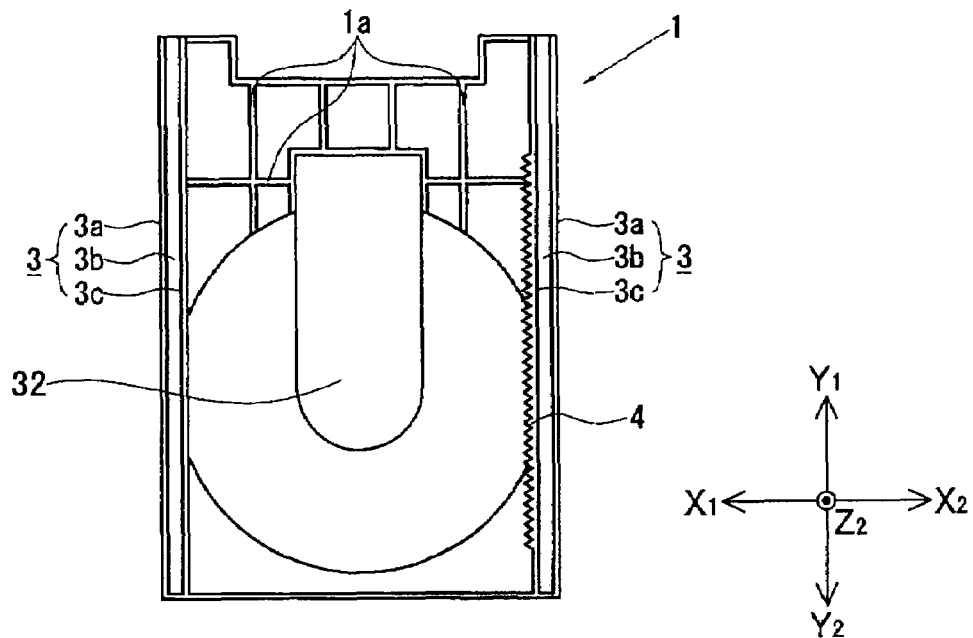
FIG. 15 is a bottom plan view of a first variation of a tray of an optical disk drive unit according to a second embodiment of the present invention.

FIG. 15 is a bottom plan view of a first variation of the tray 1 of an optical disk drive unit according to the second embodiment of the present invention. Referring to FIG. 15, a rail groove 3 is formed on each side end of the bottom surface of the tray 1 along the Y-axis as in the above-described tray 100 (FIG. 3) of the conventional optical disk drive unit. Each rail groove 3 includes an outer linear projection 3a, a groove part 3b, and an inner linear projection 3c all extending parallel to the Y-axis. The rail grooves 3 engage the rails of the frame so that the tray 1 can slide on the rails. Further, a saw-toothed rack 4 is provided to the inner linear projection 3c of one of the rail grooves 3 (the $X_2$-side rail groove 3 in FIG. 15) so as to face inward (toward the other rail groove 3) to engage the same gear as the gear 75 of the tray driving mechanism 7 of FIGS. 1 and 2.

Figure 5:
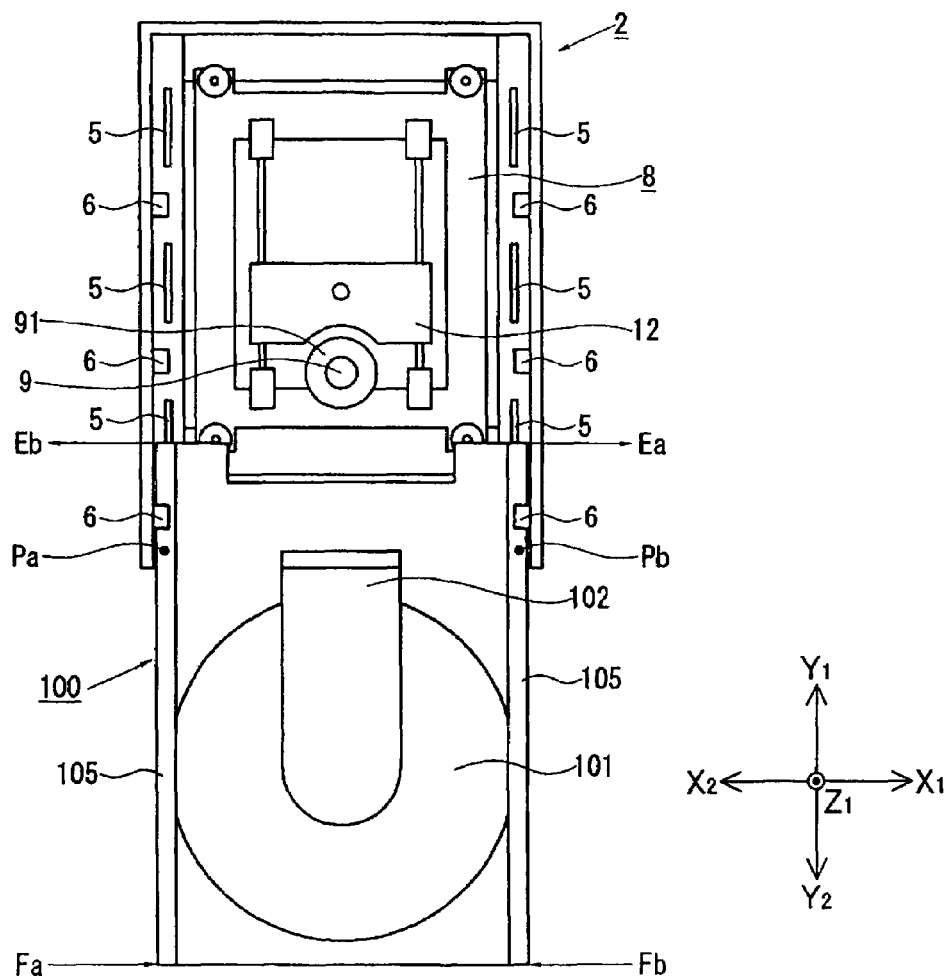
FIG. 5 is a top plan view of the conventional drive unit in a tray-unloaded state.
Figure 6A:
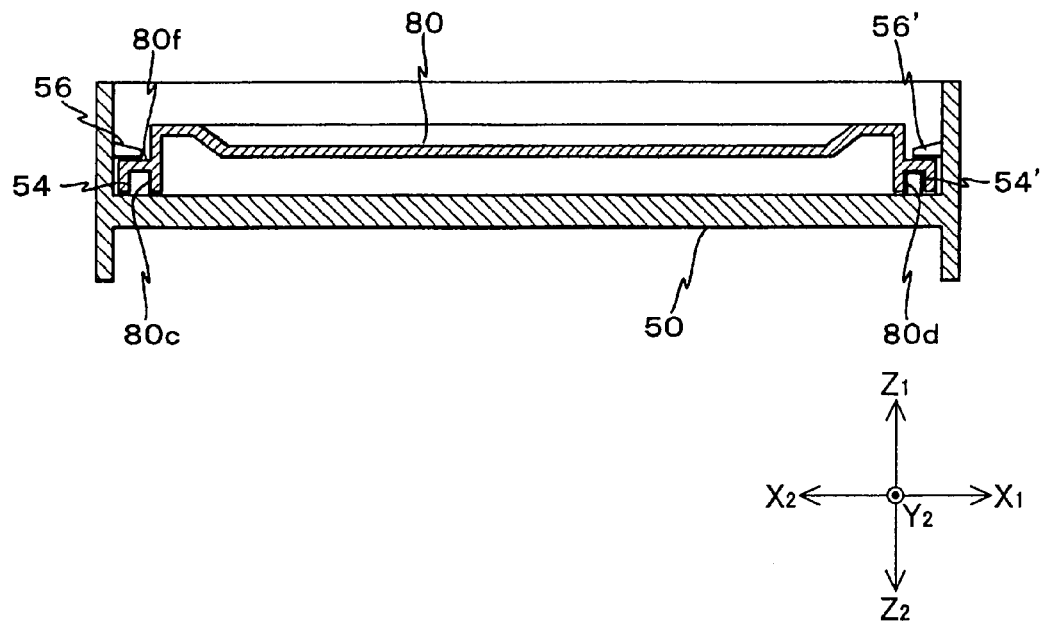
FIGS. 6A and 6B are diagrams for illustrating conventional loading mechanisms.
Figure 6B:
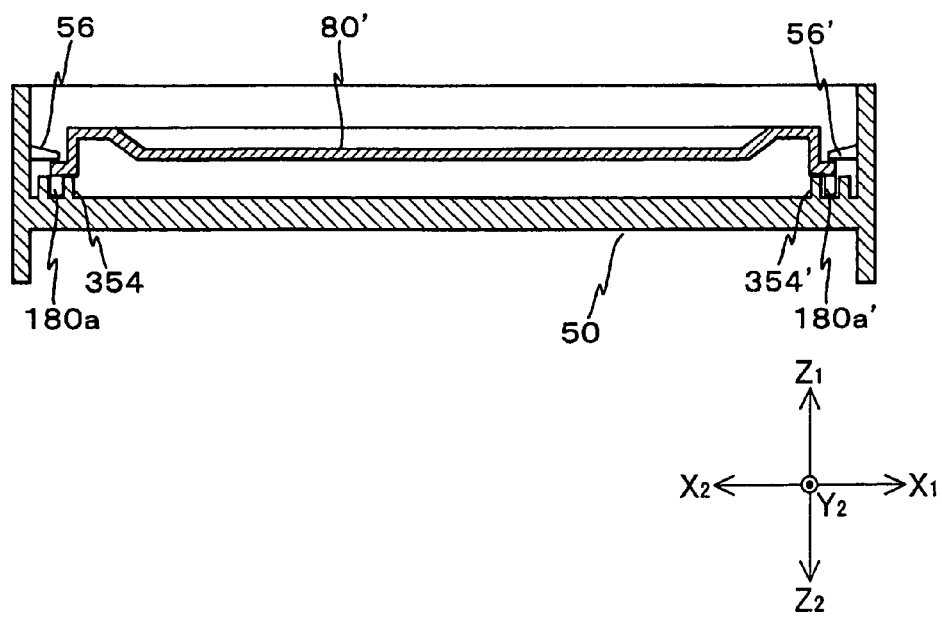
Figure 7A:
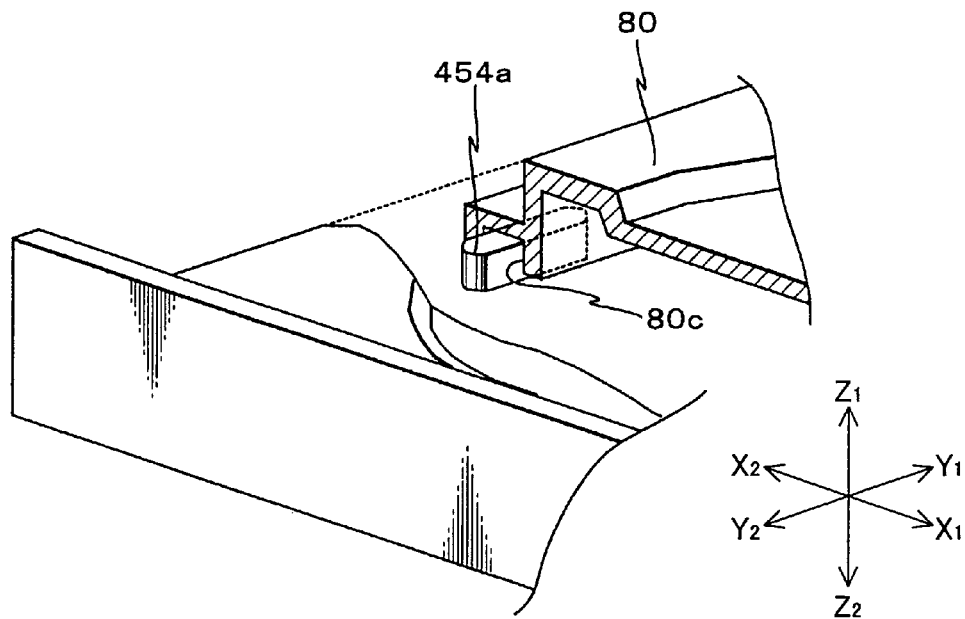
FIGS. 7A and 7B are diagrams for illustrating another conventional loading mechanism.
Figure 7B:
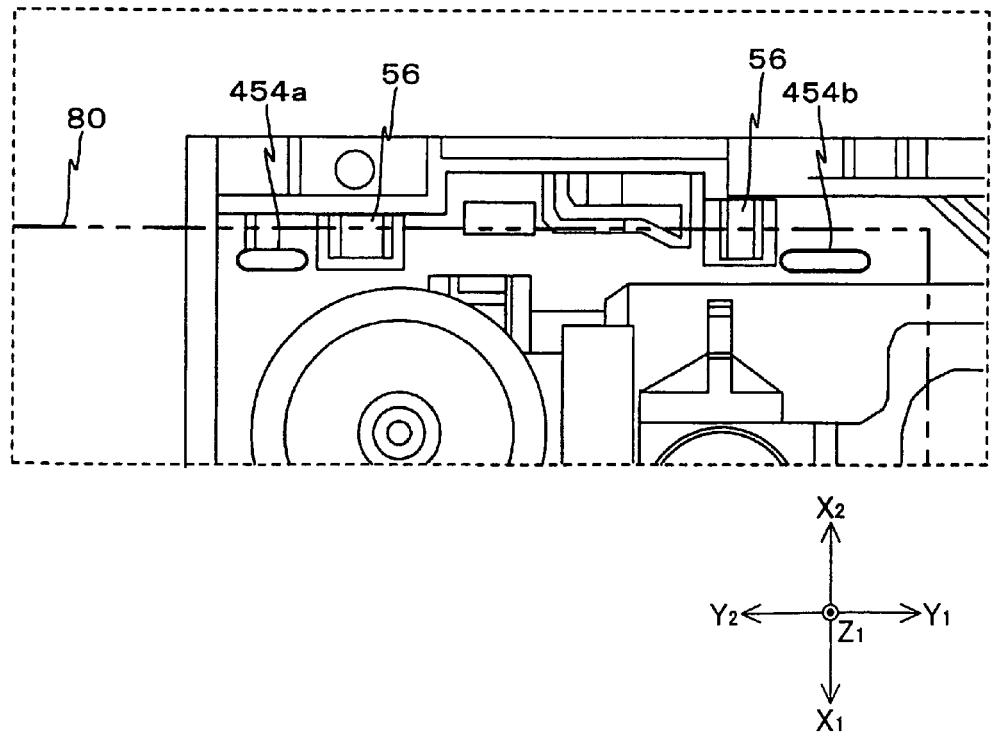

A plurality of ribs 1a are provided on the bottom surface of the rear ($Y_1$-side) part of the tray 1 parallel to the X-axis and the Y-axis. The rear part of the tray 1 is reinforced by the ribs 1a so that the rigidity of the tray 1 is improved. As a result, the rear part of the tray 1 is less likely to be bent by an external force applied to the tray 1. The deformation of the rear part of the unloaded tray 1 caused by the application of the external force Fa or Fb described with reference to FIG. 5 is reduced so that the rail grooves 3 can be prevented from disengaging from the rails 5.

Figure 16:
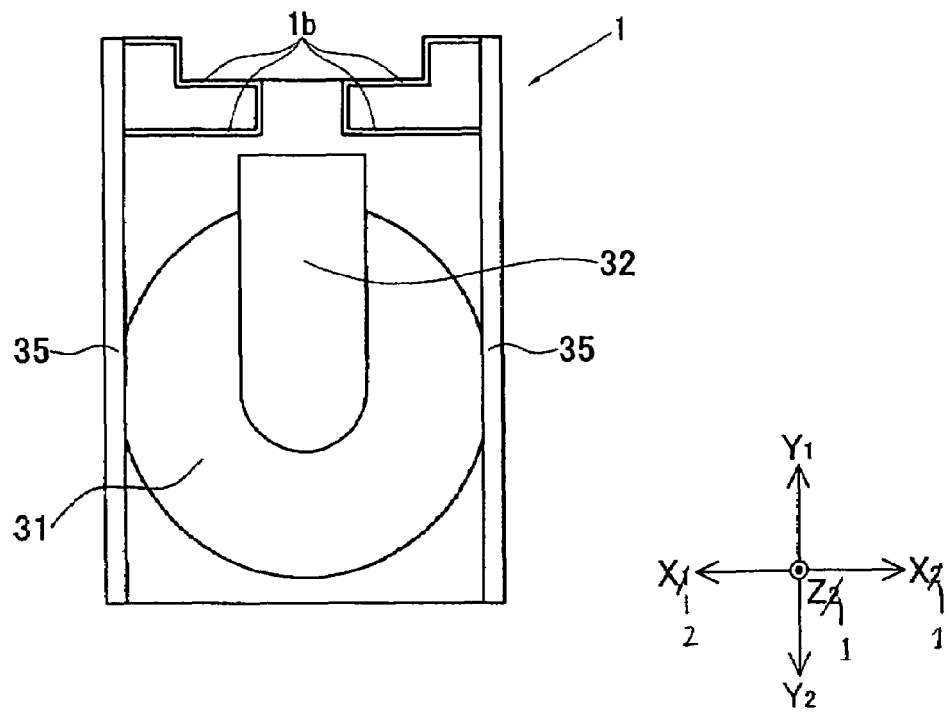
FIG. 16 is a top plan view of a second variation of the tray according to the second embodiment of the present invention.

FIG. 16 is a top plan view of a second variation of the tray 1 of the drive unit according to the second embodiment.

Referring to FIG. 16, as in the tray 100 of the conventional optical disk drive unit, a circular concave part 31 for receiving an optical disk (not shown in the drawing) and an elongated hole 32 having a rounded end in the $Y_2$ direction and a squared end in the $Y_1$ direction are also formed in the center part of the tray 1. Further, a step part 35 is formed on each side part of the tray 1 along the Y-axis.

A plurality of ribs 1*b* are provided on the top surface of the rear part of the tray 1 of FIG. 16. Generally, the center of the rear part of the tray 1 serves as a passage for the clamper 11 shown in FIG. 6 during the loading operation. Therefore, no ribs can be provided in the center of the rear part of the tray 1. However, the rigidity of the rear part of the tray 1 can be increased by the ribs 1*b* provided around the center of the rear part. Accordingly, as in the tray 1 of FIG. 15, it is possible to prevent the tray 1 of FIG. 16 from being distorted by an impact. Therefore, it is possible to prevent the rail grooves 3 from disengaging from the rails 5.

Referring back to FIG. 1, if the vertical ($Z_1$-$Z_2$) dimension of the gap (or the distance) between the tray 1 and the clamper 11 or the clamper holder 10 supporting the clamper 11 is larger than or equal to the thickness of the disk when the tray 1 is ejected by tray unloading, the disk may inadvertently enter the gap to be inserted into the drive unit. If the disk is completely inserted into the drive unit, it is impossible to extract the disk from the drive unit. If the drive unit is operated in such a state, the disk will be damaged.

In order to avoid such an accident, it is necessary to prevent an inadvertent entry of the disk into the drive unit. The entry of the disk into the drive unit can be prevented by making the vertical dimension of the gap between the tray 1 and the clamper 11 or the clamper holder 10 less than or equal to the thickness of the disk. However, if a projection is provided to, for instance, the clamper holder 10 to reduce the vertical dimension of the gap, it is necessary to reduce the vertical dimension or height of the ribs 1*b* of the tray 1 of FIG. 16 so as to prevent interference between the tray 1 and the clamper holder 10. This may make it difficult to provide the tray 1 with enough rigidity to withstand a strong external force applied thereto, such as an impact. Further, considering costs, it is desirable to achieve good assembling efficiency with a small number of components.

According to the second variation of the tray 1, the vertical dimension of the gap between the ribs 1*b* of the tray 1 and the clamper holder 10 is made less than or equal to the thickness of the disk without providing a projection to the clamper holder 10 by increasing the height of the ribs 1*b* by the height of the projection. As a result, the disk is prevented from inadvertently entering the drive unit, while the rigidity of the tray 1 can be maximized.

Further, if, for layout reasons, the drive unit cannot obtain rib height necessary for ensuring sufficient tray rigidity by providing ribs to only one of the top and bottom surfaces of the rear part of the tray 1, it is possible to provide the ribs 1*a* on the bottom surface of the rear part of the tray 1 as shown in FIG. 15 and also the ribs 1*b* on the top surface of the rear part of the tray 1 as shown in FIG. 16. As a result, the rigidity of the rear part of the tray 1 can be increased, so that the rear part of the tray 1 is less likely to be bent by an external force applied to the tray 1. Accordingly, the tray 1 can have such rigidity as to withstand a stronger external force in its ejected state.

Next, a description is given below of a third variation of the tray 1. FIG. 17A is a cross-sectional view of the tray 1 attached to the loading base (frame). 2 of the drive unit according to the third variation of the second embodiment.

Figure 2:
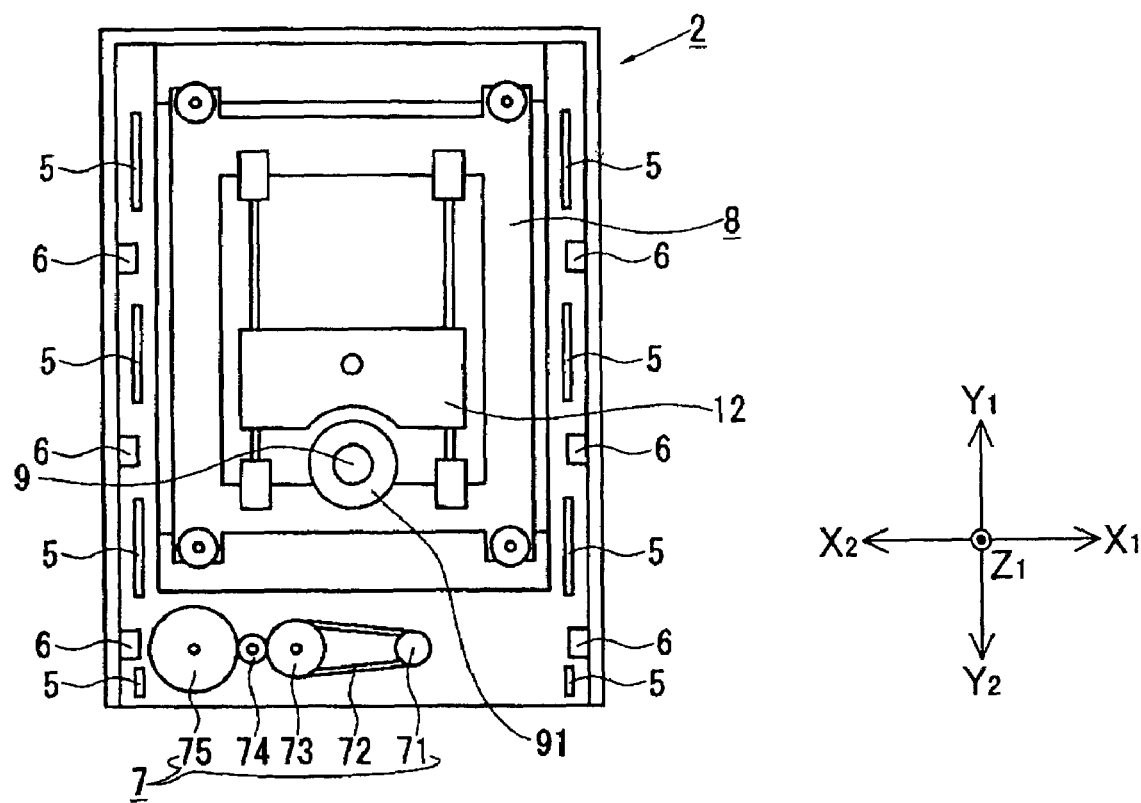
FIG. 2 is a top plan view of a loading base of the conventional drive unit.
Figure 3:
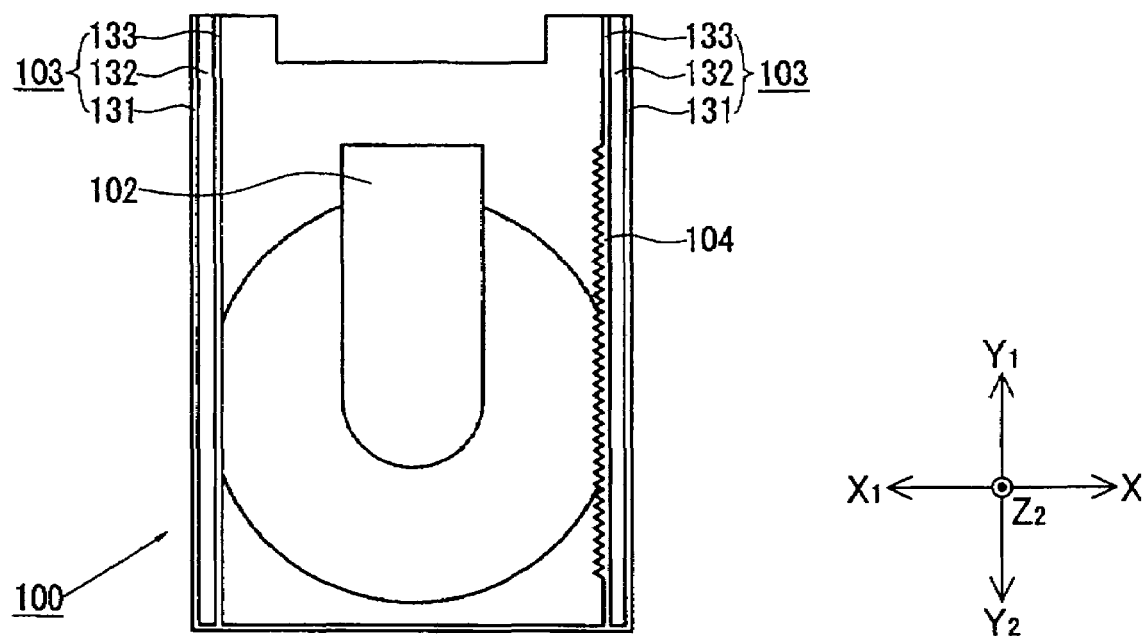
FIG. 3 is a bottom plan view of a tray of the conventional drive unit.
Figure 4:
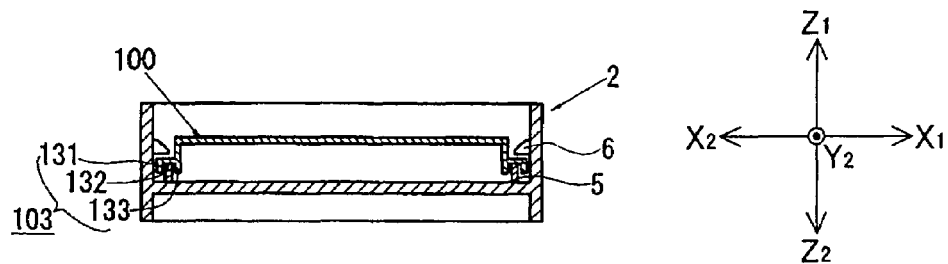
FIG. 4 is a schematic cross-sectional view of the conventional drive unit.

Referring to FIG. 17A, compared with the outer linear projection 131 of FIG. 4, the outer linear projection 3*a* of each rail groove 3 of the tray 1 is extended downward in the $Z_2$ direction (toward the surface of the loading base 2 on which surface the rails 5 are formed) without interfering with the loading base 2 during the loading operation. Accordingly, in each rail groove 3, the outer linear projection 3*a* is longer in the downward ($Z_1$) direction than the inner linear projection 3*c*.

If an external force is applied substantially to the $Y_2$-side end part of the tray 1 from the $X_1$ direction at the time of ejection of the tray 1, the rear part of the tray 1 is bent as shown in FIG. 17B. As a result, in the rear part of the tray 1, an outward stress $F_0$ is applied to the outer linear projection 3*a* of the $X_2$-side rail groove 3, while an inward stress $F_1$ is applied to the inner linear projection 3*c* of the $X_1$-side rail groove 3. If the external force is applied substantially to the $Y_2$-side end part of the tray 1 from the opposite ($X_2$) direction, the stresses $F_0$ and $F_1$ are applied in the opposite direction in the rear part of the tray 1. If such a great external force as to further increase the deformation of the tray 1 of FIG. 17B is applied to, for instance, the conventional tray 100 of FIG. 4, the outer linear projections 131 cross over the rails 5 so that the rail grooves 103 disengage from the rails 5.

However, according to the tray 1 of FIG. 17A, the outer linear projection 3*a* of each rail groove 3 is extended downward so as to increase the overlap between the outer linear projection 3*a* and the rails 5. As a result, the outer linear projection 3*a* is less likely to cross over the rails 5. Accordingly, it is possible to prevent the rail grooves 3 from disengaging from the rails 5 even if the tray 1 deforms.

It is difficult to form a tray with good flatness. According to the third variation of the tray 1 of the second embodiment, however, there is no need to increase the dimensional accuracy of each entire rail groove 3. This is because only the outer linear projection 3*a* of each rail groove 3 is extended, and therefore, the clearance between the inner linear projection 3*c* of each rail groove 3 and the loading base 2 ban be maintained.

Next, a description is given below, with reference to FIG. 18, of a fourth variation of the tray 1 according to the second embodiment. FIG. 18 is a schematic exploded view of the drive unit, showing the top surface of the tray 1 according to the fourth variation and a longitudinal section of the loading base 2 taken in the Y-Z plane.

In order to maximize the effect of the extension of the outer linear projection 3*a* of each rail groove 3 of the tray 1 of FIG. 17A, it is preferred to extend the outer linear projection 3*a* as much as possible without the outer linear projection 3*a* interfering with the frame 2. However, it is difficult to form the entire outer linear projection 3*a* with such highly accurate dimensions. Failure in forming the entire outer linear projection 3*a* with such high accuracy causes the outer linear projection 3*a* to come into contact with the loading base 2, thus resulting in an increase in sliding resistance. Consequently, a heavier load may be applied to the loading motor 71 at the time of tray loading or unloading. This, in the worst case, may lead to failure in tray loading or unloading.

As indicated by the imaginary (double-dot chain) line in FIG. 18, the tray 1 has a portion of its rear part remaining inside the drive unit when the tray 1 is ejected. It is the rear part of the tray 1 that may disengage from the frame 2 at the time of ejection of the tray 1. Therefore, according to the fourth variation of the tray 1, in the above-described remaining portion of its rear part, the vertical ($Z_1$-$Z_2$) dimension of each outer linear projection 3*a* is provided with strict dimensional tolerance particularly within the range of its part A (FIG. 18) engaging the rail 5. That is, the tolerance for the downward extension of each outer linear projection 3*a* is reduced exclusively for a part 3*a*, thereof, and minus tolerance is applied to each outer linear projection 3*a* in the rest of the remaining portion of the rear part of the tray 1. By this configuration according to the fourth variation, the tray 1 can be formed easily without losing tolerance to tray disengagement against an external force.

Further, if the fitting of tray 1 with the loading base 2 includes a vertical backlash (along the Z-axis), the tray 1 is apt to disengage from the loading base 2 when an impact is applied to the tray 1. Therefore, on a step part 35 formed on each side of the tray 1 along the Y-axis, a vertically projecting part 35a is provided in a region B (FIG. 18) including the plane of projection of the tray holder 6 at the time of ejection of the tray 1 (that is, the tray holder 6 positioned furthest in the $Y_2$ direction in FIG. 18). As previously described, if an external force is applied to the tray 1, the tray 1 is bent as shown in FIG. 17B so that the outer linear projections 3a may cross over the rails 5 with the passage of time. According to the fourth variation of the tray 1, the vertical backlash is reduced by decreasing the gap between the tray holders 6 and the step parts 35 of the tray 1, so that the lift of the tray 1 at the time of its ejection can be controlled. As a result, the outer linear projections 3a are less likely to cross over the rails 5 so that the tray 1 can be prevented from disengaging from the loading base 2.

According to the fourth variation of the tray 1, the clearance between the tray holders 6 and the rear part of the tray 1 is reduced. Therefore, the lift of the tray 1 can be prevented when an impact is applied thereto. Accordingly, it is possible to make the rail grooves 3 of the tray 1 less likely to disengage from the rails 5 of the loading base 2. Further, the projecting parts 35a are formed only on the parts of the rear part of the tray 1 which parts corresponds to the tray holders 6 when the tray 1 is ejected. Accordingly, strict dimensional tolerance is required only for the projecting parts 35a, but not for the entire tray 1.

Further, the clearance between the tray 1 and the tray holders 6 is reduced only on the parts of the tray 1 which parts include the projecting parts 35a. This prevents such an increase in the sliding resistance of the tray 1 as to cause failure in loading or unloading.

Figure 19:
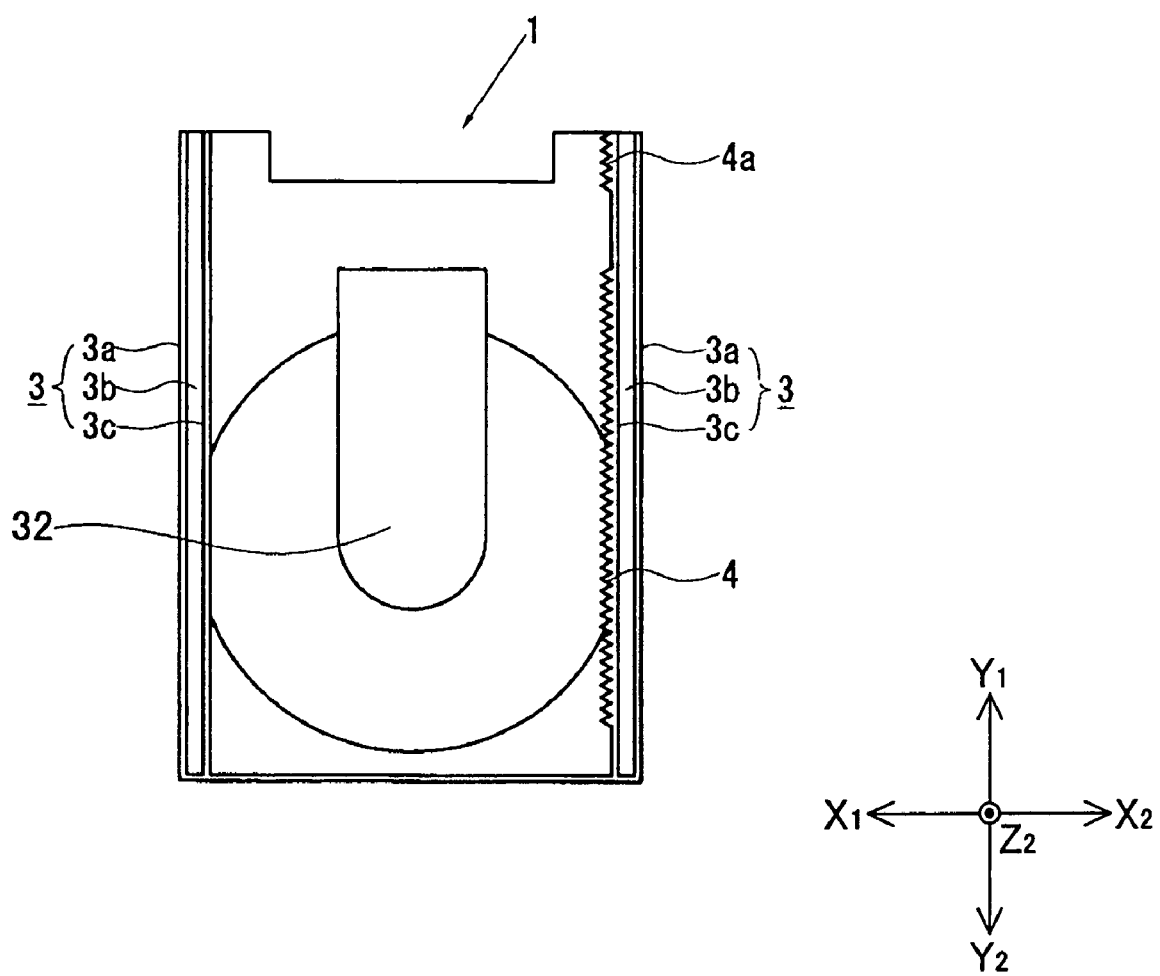
FIG. 19 is a bottom plan view of a fifth variation of the tray 1 according to the second embodiment of the present invention.

Next, a description is given below, with reference to FIG. 19, of a fifth variation of the tray 1 according to the second embodiment. FIG. 19 is a bottom plan view of the fifth variation of the tray 1.

In the drive unit of the second embodiment, the rack 4 for tray loading and unloading is provided to the inner linear projection 3c of the $X_2$-side rail groove 3 of the tray 1. If the thickness of the $X_2$-side inner linear projection 3c is increased in the inward ($X_1$) direction in this drive unit, the loading gear 75 (FIG. 1) prevents the tray 1 from being inserted into the loading base 2 at the time of assembling the drive unit. Accordingly, the strength of the $X_2$-side inner linear projection 3c cannot be increased by simply increasing its $X_1$-$X_2$ thickness.

Therefore, according to the fifth variation of the tray 1, a reinforcement (auxiliary) rack 4a having the same shape as the rack 4 is provided to the rear part of the $X_2$-side inner linear projection 3c as shown in FIG. 19 so as to solve the above-described problem.

This provision of the reinforcement rack 4a to the rear part of the $X_2$-side inner linear projection 3c has substantially the same effect as an increase in the thickness of the $X_2$-side inner linear projection 3c in the rear part of the tray 1. As a result, the strength of the rear part of the $X_2$-side inner linear projection 3c increases. Further, the reinforcement rack 4a, which has the same shape as the rack 4, can engage the loading gear 75 of the loading base 2. Therefore, the reinforcement rack 4a is prevented from interfering with the loading gear 75 at the time of attaching the tray 1 to the loading base 2.

Thus, by providing the reinforcement rack 4a, which does not function for tray loading or unloading, in the vicinity of the rear end of the tray 1, the strength of the inner linear projection 3c of the $X_2$-side rail groove 3 can be improved, and the tray 1 can be inserted into the loading base 2 without interference by the loading gear 75.

If a strong impact is applied to the ejected tray 1, it may be impossible to prevent the tray 1 from disengaging from the loading base 2 with only one of the above-described configurations being provided to the tray 1.

If an external force such as an impact is applied to the ejected tray 1, the tray 1 or the loading base 2 deforms instantaneously. Such an external force causes more deformation than a static load. Therefore, if the impact force is great, it may be insufficient to provide the tray 1 with only one of the above-described configurations.

Therefore, the tray 1 may be provided with two or more of the above-described configurations in combination as required. That is, all or some of (a) the formation of the ribs 1a on the bottom surface of the rear part of the tray 1, (b) the formation of the ribs 1b on the top surface of the rear part of the tray 1, (c) the downward extension of the outer linear projections 3a of the rail grooves, (d) the formation of the projecting-parts 35a in the parts of the step parts 35 corresponding to the tray holders 6 at the time of ejection of the tray 1, and (e) the provision of the reinforcement rack 4a in the vicinity of the rear end of one of the outer linear projections 3a may be performed simultaneously in a desired combination on the tray 1. With two or more of the above-described configurations, the tray 1 can withstand greater external forces. Thereby, it can be ensured that the tray 1 does not disengage from the loading base 2 when ejected.

Thus, according to the loading mechanism and the drive unit including the same according to the second embodiment, even if an external force is applied to the ejected tray 1, the tray 1 can prevent its rail grooves 3 from disengaging from the rails 5 of the frame 2. Further, it is possible to provide the tray 1 with tolerance to strong impacts without complicating its structure or making its assembling operation difficult. Accordingly, the loading mechanism of the second embodiment is less subject to breakage and can enjoy a long useful service life, and the drive unit of the second embodiment can be used stably for a long period of time.

Third Embodiment

Figure 20:
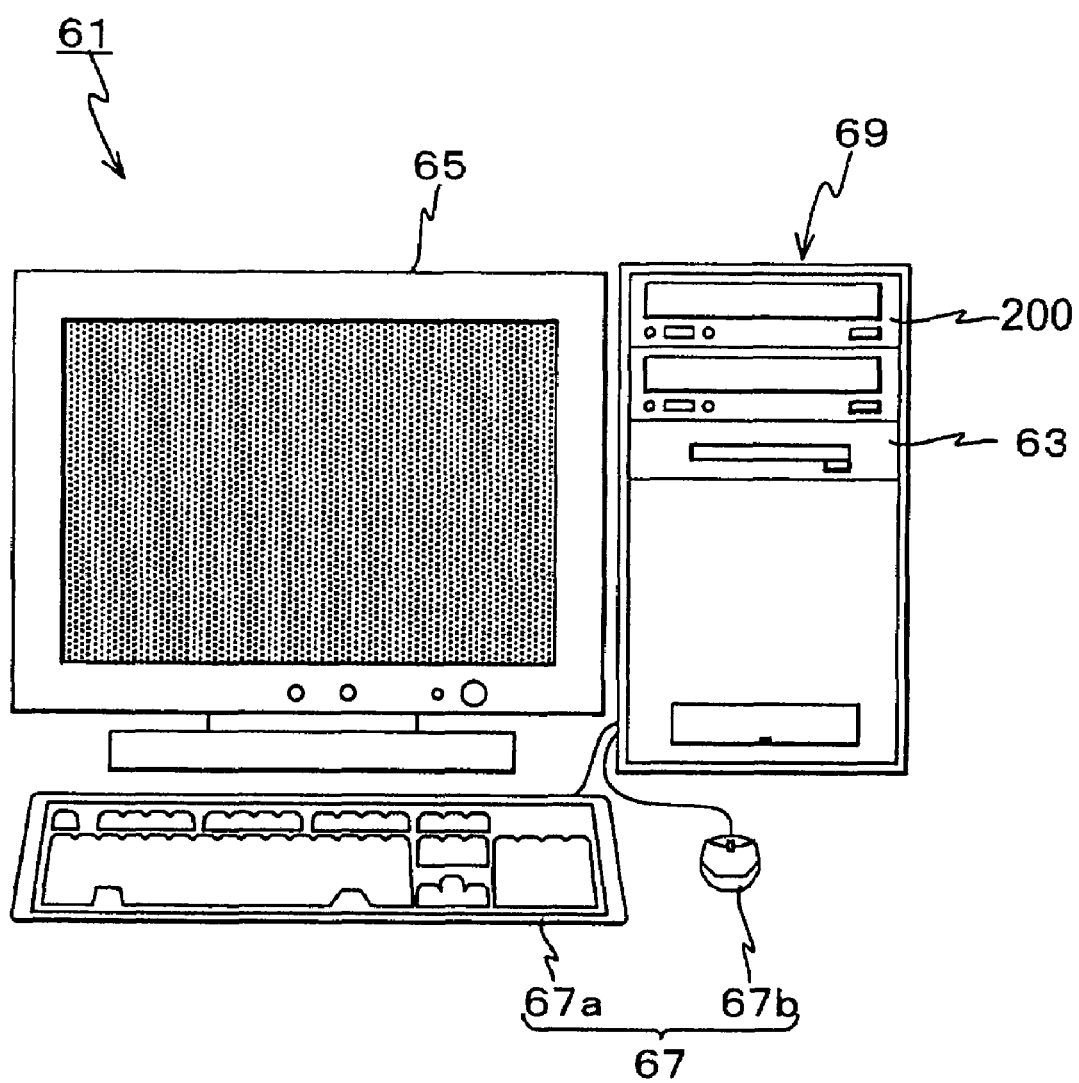
FIG. 20 is a schematic diagram showing an information processing apparatus according to a third embodiment of the present invention.

A description is given below, with reference to FIG. 20, of an information processing apparatus according to a third embodiment of the present invention. In this embodiment, the drive unit 200 of the first embodiment or the drive unit of the second embodiment may be applied to a personal computer (PC) 61 as an information processing apparatus. In the following, the drive unit 200 of the first embodiment is applied to the PC 61 for convenience of description. The PC 61 includes a monitor 65 and a computer main body 69 to which input devices 67 including a keyboard 68a and a mouse 67b are connected. The computer main body 69 houses a CPU, a ROM, a RAM, an I/O interface, and a hard disk.

The computer main body 69 includes the drive unit 200 as well as a 3.5-inch floppy disk drive unit 63. The drive unit 200 may be of an integrally housed type or a so-called built-in type.

The PC 61 includes the drive unit 200 having a long useful service life as previously described. Therefore, the PC 61 can be used for a long period of time for information recording and reproduction.

The drive unit of the present invention is not necessarily to be housed in an information processing apparatus as in this embodiment, but may be provided as an independent unit or connected to an information processing apparatus such as an external host. Further, the drive unit of the present invention is applicable not only to a desktop model PC such as the PC 61 but also to a portable PC such as a notebook PC.

Further, the drive unit of the present invention is applicable not only to a PC but also to various information processing apparatuses such as a workstation.

Further, in the third embodiment, not only a drive unit for a CD-type medium but also a drive unit that can support any of the above-described various information recording media is applicable to the information processing apparatus of the present invention.

The present invention is not limited to the specifically disclosed embodiments, and variations and modifications may be made without departing from the scope of the present invention.

The present application is based on Japanese priority applications No. 2002-253707 and No. 2002-256225, both filed on Aug. 30, 2002, the entire contents of which are hereby incorporated by reference.

What is claimed is:

1. A loading mechanism, comprising:
   a tray for transporting an optical disk, the tray including a rail groove and a disk placement surface on which the optical disk is placeable;
   a frame including a rail engaging the rail groove of said tray, and a drive mechanism for driving said tray in first and second opposite directions, the drive mechanism driving said tray so that said tray slides on the rail so as to be ejected in the first direction at a time of unloading said tray; and
   a rib provided on at least one of first and second opposite surfaces of a rear part of said tray, the rear part including a portion of said tray which portion remains inside said frame when said tray is ejected, the first and second opposite surfaces of the rear part being parallel to the disk placement surface of said tray.

2. The loading mechanism as claimed in claim 1, wherein:
   said rib is provided on at least the first surface of the rear part, the first surface being included in the disk placement surface of said tray; and
   a dimension of said rib in a direction perpendicular to the first surface of the rear part is determined so that a distance between said rib and one of a clamper for holding the optical disk in said frame and a damper holder for holding the damper is less than or equal to a thickness of the optical disk.

3. An optical disk drive unit, comprising:
   a main body; and a loading mechanism as set forth in claim 1, the loading mechanism being attached to said main body.

4. The optical disk drive unit as claimed in claim 3, wherein:
   said rib is provided on at least the first surface of the rear part, the first surface being included in the disk placement surface of said tray; and
   a dimension of said rib in a direction perpendicular to the first surface of the rear part is determined so that a distance between said rib and one of a clamper for holding the optical disk in said frame and a damper holder for holding the clamper is less than or equal to a thickness of the optical disk.

5. A loading mechanism, comprising:
   a tray for transporting an optical disk, the tray including a rail groove and a disk placement surface on which the optical disk is placeable; and a
   frame including a rail engaging the rail groove of said tray, and a drive mechanism for driving said tray in first and second opposite directions, the drive mechanism driving said tray so that said tray slides on the rail so as to be ejected in the first direction at a time of unloading said tray, wherein:
   the rail groove includes first and second linear projections each extending along the first and second opposite directions, the second linear projection being closer to a center of said tray than the first linear projection is; and
   a dimension of the first linear projection in a direction perpendicular to the disk placement surface of said tray is maximized within a range that prevents the first linear projection from interfering with said frame so that an overlap between the rail and the first linear projection increases.

6. The loading mechanism as claimed in claim 5, wherein the dimension of the first linear projection in the direction perpendicular to the disk placement surface of said tray is provided with a smaller tolerance in a first part of a portion of said tray than in a second part of the portion of said tray, the portion of said tray remaining inside said frame with the first part thereof engaging the rail when said tray is ejected; and
   the dimension of the first linear projection in the direction perpendicular to the disk placement surface of said tray is provided with minus tolerance in the second part of the portion of said tray.

7. An optical disk drive unit, comprising:
   a main body; and a loading mechanism as set forth in claim 5, the loading mechanism being attached to said main body.

8. The optical disk drive unit as claimed in claim 7, wherein
   the dimension of the first linear projection in the direction perpendicular to the disk placement surface of said tray is provided with a smaller tolerance in a first part of a portion of said tray than in a second part of the portion of said tray, the portion of said tray remaining inside said frame with the first part thereof engaging the rail when said tray is ejected; and
   the dimension of the first linear projection in the direction perpendicular to the disk placement surface of said tray is provided with minus tolerance in the second part of the portion of said tray.

9. A loading mechanism, comprising:
   a tray for transporting an optical disk, the tray including a rail groove and a disk placement surface on which the optical disk is placeable; and
   a frame including a rail engaging the rail groove of said tray, and a drive mechanism for driving said tray in first and second opposite directions, the drive mechanism driving said tray so that said tray slides on the rail so as to be ejected in the first direction at a time of unloading said tray, the frame further including a plurality of tray holding parts for preventing said tray from being lifted in a direction away from said frame,
   wherein a projection in a direction away from said frame and perpendicular to the disk placement surface of said tray is provided to said tray in at least a region that opposes any of the tray holding parts when said tray is ejected.

10. An optical disk drive unit, comprising:
a main body; and a loading mechanism as set forth in claim 9, the loading mechanism being attached to said main body.

11. A loading mechanism, comprising:
a tray for transporting an optical disk, the tray including a rail groove including a linear projection to which a rack is provided;
a frame including a rail engaging the rail groove of said tray, and a drive mechanism for driving said tray in first and second opposite directions, the drive mechanism including a loading motor and a loading gear engaging the rack of said tray, the drive mechanism driving said tray so that said tray slides on the rail so as to be ejected in the first direction at a time of unloading said tray; and
an auxiliary rack provided to an end part in the second direction of the linear projection of the rail groove of said tray.

12. An optical disk drive unit, comprising:
a main body; and a loading mechanism as set forth in claim 11, the loading mechanism being attached to said main body.

* * * * *